(12) United States Patent
Kim et al.

(10) Patent No.: US 10,344,102 B2
(45) Date of Patent: Jul. 9, 2019

(54) OLEFIN-BASED POLYMER WITH EXCELLENT PROCESSABILITY

(71) Applicant: LG CHEM, LTD., Seoul (KR)

(72) Inventors: Joong Soo Kim, Daejeon (KR); Yu Taek Sung, Daejeon (KR); Ki Soo Lee, Daejeon (KR); Dae Sik Hong, Daejeon (KR); Ki Heon Song, Daejeon (KR); Eun Kyoung Song, Daejeon (KR); Heon Yong Kwon, Daejeon (KR); Yong Ho Lee, Daejeon (KR); Dong Hoon Jeong, Daejeon (KR); Soon Ho Sun, Daejeon (KR); Sun Mi Kim, Daejeon (KR)

(73) Assignee: LG CHEM, LTD., Seoul (KR)

( * ) Notice: Subject to any disclaimer, the term of this patent is extended or adjusted under 35 U.S.C. 154(b) by 87 days.

(21) Appl. No.: 15/504,269

(22) PCT Filed: Sep. 4, 2015

(86) PCT No.: PCT/KR2015/009371
§ 371 (c)(1),
(2) Date: Feb. 15, 2017

(87) PCT Pub. No.: WO2016/036204
PCT Pub. Date: Mar. 10, 2016

(65) Prior Publication Data
US 2018/0223009 A1    Aug. 9, 2018

(30) Foreign Application Priority Data

Sep. 5, 2014  (KR) .................. 10-2014-0119258
Sep. 3, 2015  (KR) .................. 10-2015-0125131

(51) Int. Cl.
| | | |
|---|---|---|
| *C08F 4/648* | (2006.01) | |
| *C08L 23/08* | (2006.01) | |
| *C08F 4/659* | (2006.01) | |
| *C08F 210/16* | (2006.01) | |
| *B01J 27/24* | (2006.01) | |
| *C08F 4/6592* | (2006.01) | |
| *C08F 10/02* | (2006.01) | |

(52) U.S. Cl.
CPC .............. *C08F 4/648* (2013.01); *B01J 27/24* (2013.01); *C08F 4/6592* (2013.01); *C08F 4/65904* (2013.01); *C08F 10/02* (2013.01); *C08F 210/16* (2013.01); *C08L 23/0815* (2013.01); *C08F 4/65912* (2013.01); *C08F 4/65916* (2013.01); *C08F 4/65925* (2013.01); *C08F 4/65927* (2013.01); *C08F 2420/02* (2013.01); *C08F 2420/06* (2013.01); *C08F 2500/02* (2013.01); *C08F 2500/04* (2013.01); *C08F 2500/12* (2013.01); *C08F 2800/10* (2013.01)

(58) Field of Classification Search
CPC .................. C08F 210/16; C08F 4/65904; C08L 23/0815
See application file for complete search history.

(56) References Cited

U.S. PATENT DOCUMENTS

| | | |
|---|---|---|
| 4,935,474 A | 6/1990 | Ewen et al. |
| 5,064,802 A | 11/1991 | Stevens et al. |
| 5,532,396 A | 7/1996 | Winter et al. |
| 5,914,289 A | 6/1999 | Razavi |
| 6,620,895 B1 | 9/2003 | Cotts et al. |
| 6,828,394 B2 | 12/2004 | Vaughan et al. |
| 6,841,631 B2 | 1/2005 | Loveday et al. |
| 6,894,128 B2 | 5/2005 | Loveday et al. |
| 7,312,283 B2* | 12/2007 | Martin ................. C08F 10/00 502/103 |
| 9,988,469 B2* | 6/2018 | Song .................... C08F 4/64 |
| 2002/0082365 A1 | 6/2002 | McDaniel et al. |
| 2003/0055176 A1 | 3/2003 | Jacobsen et al. |
| 2003/0149180 A1 | 8/2003 | Van Dun et al. |
| 2003/0195306 A1 | 10/2003 | Tsuie et al. |
| 2003/0229188 A1 | 12/2003 | Nagy et al. |
| 2004/0077810 A1 | 4/2004 | Marechal |
| 2004/0220320 A1 | 11/2004 | Abhari et al. |
| 2007/0135595 A1 | 6/2007 | Voskoboynikov et al. |
| 2008/0045663 A1 | 2/2008 | Kolb et al. |
| 2010/0121006 A1 | 5/2010 | Cho et al. |
| 2010/0298511 A1 | 11/2010 | Kuo et al. |
| 2011/0212283 A1 | 9/2011 | Fantinel et al. |
| 2012/0010375 A1 | 1/2012 | Yang et al. |
| 2012/0015123 A1 | 1/2012 | Kwon et al. |
| 2012/0059134 A1* | 3/2012 | Yang .................. C08F 10/00 526/113 |

(Continued)

FOREIGN PATENT DOCUMENTS

| | | |
|---|---|---|
| CN | 101679540 A | 3/2010 |
| EP | 2 374 822 A2 | 10/2011 |

(Continued)

OTHER PUBLICATIONS

Stefan Trinkle et al., "Van Gurp-Palmen-plot: a way to characterize polydispersity of linear polymers" Rheol Acta, 2001, 40, pp. 322-328.

*Primary Examiner* — Caixia Lu
(74) *Attorney, Agent, or Firm* — Dentons US LLP

(57) ABSTRACT

Provided is an olefin-based polymer with excellent processability. The olefin-based polymer according to the present invention has a high molecular weight and a broad molecular weight distribution to show excellent processability and improved mechanical properties, thereby being usefully applied according to the intended use.

14 Claims, 3 Drawing Sheets

(56) References Cited

U.S. PATENT DOCUMENTS

| | | | |
|---|---|---|---|
| 2012/0123078 A1 | 5/2012 | Lee et al. | |
| 2012/0329641 A1 | 12/2012 | Yang et al. | |
| 2013/0225834 A1 | 8/2013 | Shin et al. | |
| 2013/0345377 A1 | 12/2013 | Ker et al. | |
| 2014/0128563 A1 | 5/2014 | McDaniel et al. | |
| 2015/0126692 A1* | 5/2015 | Sukhadia | C08L 23/0815 |
| | | | 526/64 |
| 2016/0159828 A1 | 6/2016 | Lee et al. | |
| 2016/0168281 A1 | 6/2016 | Lee et al. | |
| 2016/0237187 A1 | 8/2016 | Hong et al. | |

FOREIGN PATENT DOCUMENTS

| | | |
|---|---|---|
| EP | 3041873 A2 | 7/2016 |
| EP | 3056524 A1 | 8/2016 |
| JP | 2008-195963 A | 8/2008 |
| JP | 2009-504901 A | 2/2009 |
| JP | 2012-503687 A | 2/2012 |
| JP | 2013-47341 A | 3/2013 |
| KR | 10-2000-0011110 A | 2/2000 |
| KR | 10-2004-0030139 A | 4/2004 |
| KR | 10-2004-0076965 A | 9/2004 |
| KR | 10-2005-0024287 A | 3/2005 |
| KR | 10-2006-0117382 A | 11/2006 |
| KR | 10-2010-0067627 A | 6/2010 |
| KR | 10-2011-0013286 A | 2/2011 |
| KR | 10-2012-0007718 A | 1/2012 |
| KR | 10-2012-0087706 A | 8/2012 |
| KR | 10-2013-0033362 A | 4/2013 |
| KR | 10-2013-0046408 A | 5/2013 |
| KR | 10-2013-0113322 A | 10/2013 |
| KR | 10-2014-0119258 A | 10/2014 |
| KR | 10-2015-0037520 A | 4/2015 |
| KR | 10-2015-0062004 A | 6/2015 |
| KR | 10-2015-0096665 A | 8/2015 |
| KR | 10-2015-0125131 A | 11/2015 |
| RU | 2142466 C1 | 12/1999 |
| RU | 2237066 C2 | 9/2004 |
| RU | 2446179 C2 | 3/2012 |
| RU | 2455316 C2 | 7/2012 |
| WO | 2004/076502 A1 | 9/2004 |
| WO | 2012/169812 A2 | 12/2012 |
| WO | 2015/034816 A2 | 3/2015 |

\* cited by examiner

OLEFIN-BASED POLYMER WITH EXCELLENT PROCESSABILITY

CROSS-REFERENCE TO RELATED APPLICATION

This application is a National Stage Application of International Application No. PCT/KR2015/009371 filed on Sep. 4, 2015, which claims the benefit of Korean Patent Application No. 10-2014-0119258 filed on Sep. 5, 2014 and Korean Patent Application No. 10-2015-0125131 filed on Sep. 3, 2015, all of which are hereby incorporated by reference in their entirety for all purposes as if fully set forth herein.

BACKGROUND OF THE INVENTION

(a) Field of the Invention

The present disclosure relates to an olefin-based polymer with excellent processability.

(b) Description of the Related Art

Olefin polymerization catalyst systems may be divided into Ziegler-Natta and 2,3,locene catalyst systems, and these two highly active catalyst systems have been developed in accordance with their characteristics. The Ziegler-Natta catalyst has been widely applied to commercial processes since it was developed in the 1950's. However, since the Ziegler-Natta catalyst is a multi site catalyst with several different active sites, it is characterized by producing polymers with a broad molecular weight distribution. Also, since compositional distribution of comonomers is not uniform, it is difficult to provide the desired physical properties.

Meanwhile, the metallocene catalyst includes a main catalyst whose main component is a transition metal compound and an organometallic compound cocatalyst whose main component is aluminum. Such a catalyst is a homogeneous complex catalyst and a single-site catalyst, and offers a polymer having a narrow molecular weight distribution and uniform compositional distribution of comonomers, depending on the single site characteristics. The stereoregularity, copolymerization characteristics, molecular weight, crystallinity, and so forth of the polymer may be controlled by changing a ligand structure of the catalyst and polymerization conditions.

U.S. Pat. No. 5,914,289 describes a method of controlling the molecular weight and the molecular weight distribution of polymers using metallocene catalysts which are respectively supported on supports. However, a large amount of solvent and a long preparation time are required for preparing the supported catalysts, and the process of supporting metallocene catalysts on the respective supports is troublesome.

Korean Patent Application No. 2003-12308 discloses a method of controlling the molecular weight distribution by polymerizing polymers while changing a combination of catalysts in a reactor by supporting a dinuclear metallocene catalyst and a mononuclear metallocene catalyst on a support together with an activating agent. However, this method is limited in simultaneous implementation of properties of the respective catalysts. In addition, there is a disadvantage that a metallocene catalyst portion is departed from a final supported catalyst to cause fouling in the reactor.

Therefore, to solve the above drawbacks, there is a continuous demand for a method of preparing olefin-based polymers with the desired physical properties by easily preparing a hybrid supported metallocene catalyst with an excellent activity.

Meanwhile, linear low-density polyethylene is prepared by copolymerization of ethylene and alpha olefin at a low pressure using a polymerization catalyst, and is a resin having a narrow molecular weight distribution and short chain branches with a predetermined length, along with the lack of long chain branches. Linear low-density polyethylene films have high strength at break and elongation, and excellent tear strength and falling weight impact strength, in addition to general characteristics of polyethylene, and therefore, their use is growing in the fields of stretch films, overwrap films, etc., to which the existing low-density polyethylene or high-density polyethylene has been hardly applied.

A process of preparing linear low-density polyethylene using 1-butene or 1-hexene as a comonomer is generally performed in a single gas phase reactor or a single loop slurry reactor, and its productivity is higher than a process using 1-octene comonomers. However, due to limitations of catalyst and process technologies, the product has physical properties inferior to those of a product obtained by using 1-octene comonomers, and has a narrow molecular weight distribution to show poor processability. Many efforts have been made to improve these problems.

U.S. Pat. No. 4,935,474 discloses a method of preparing polyethylene with a broad molecular weight distribution by using two or more metallocene compounds. U.S. Pat. No. 6,828,394 discloses a method of preparing polyethylene having excellent processability, in particular, being suitable for films by using a mixture of a "good comonomer incorporator" and a "poor comonomer incorporator". In addition, U.S. Pat. Nos. 6,841,631 and 6,894,128 disclose that polyethylene having a bimodal or multimodal molecular weight distribution is prepared by using a metallocene catalyst containing at least two metal compounds, thereby being applied to films, blow molded products, pipes, etc. However, even though these products have improved processability, the dispersion state according to the molecular weight in a unit particle is not uniform, and thus appearance is rough and physical properties are not stable under relatively desirable extrusion conditions.

Under this background, there is a continuous demand for an excellent product in which a balance between physical properties and processability is ensured, and improvement thereof is further required.

SUMMARY OF THE INVENTION

In order to solve problems of the prior art, the present disclosure provides an olefin-based polymer with excellent processability and improved mechanical properties.

The present disclosure provides an olefin-based polymer having a molecular weight distribution (Mw/Mn) of 5 to 30;

a melt flow rate ratio ($MFR_{21.6}/MFR_{2.16}$) of 35 to 200, which is measured at 190° C. in accordance with ASTM1238;

a slope of −0.8 to −0.2 in a curve of complex viscosity (($\eta^*$[Pa·s]) versus frequency ($\omega$[rad/s]); and a CI (Co-monomer Incorporation) Index of 0.5 to 5.

An olefin-based polymer according to the present invention has excellent processability and mechanical properties, thereby being usefully applied to films, pipes, etc.

DETAILED DESCRIPTION OF THE EMBODIMENTS

Figure 1:
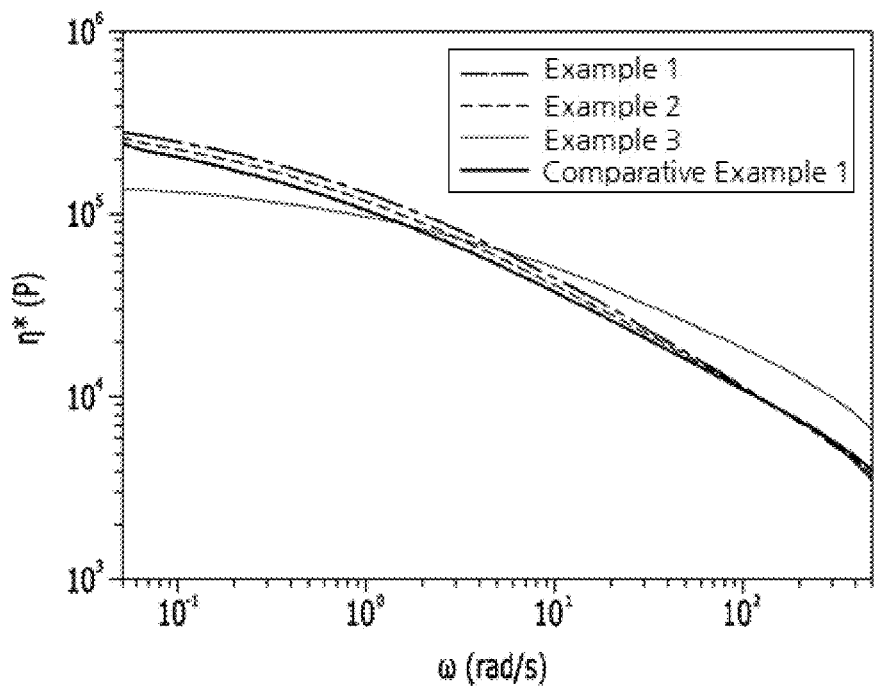
FIG. 1 is a graph showing a relationship between frequency and complex viscosity of olefin-based polymers according to Examples and Comparative Examples of the present invention.

Hereinafter, the present invention will be described in more detail.

An olefin-based polymer according to the present invention is characterized by having a molecular weight distribution (Mw/Mn) of 5 to 30; a melt flow rate ratio ($MFR_{21.6}/MFR_{2.16}$) of 35 to 200, which is measured at 190° C. in accordance with ASTM1238; a slope of −0.8 to −0.2 in a curve of complex viscosity ($\eta^*[Pa \cdot s]$) versus frequency ($\omega[rad/s]$); and a CI (Co-monomer Incorporation) Index of 0.5 to 5.

The olefin-based polymer of the present invention may exhibit a broad molecular weight distribution (Mw/Mn, PDI) of about 5 to about 30, preferably about 6 to about 20, thereby showing excellent processability.

According to an embodiment of the present invention, the olefin-based polymer may have a weight average molecular weight (Mw) of about 100,000 to about 300,000 g/mol, preferably about 100,000 to about 250,000 g/mol, but is not limited thereto.

The olefin-based polymer of the present invention may have a high molecular weight and a broad molecular weight distribution and excellent physical properties and processability.

In other words, the olefin-based copolymer of the present invention may exhibit a broad molecular weight distribution and melt flow rate ratio (MFRR), compared to the known olefin-based copolymers, and thus has remarkably improved flowability to show more excellent processability.

The olefin-based copolymer of the present invention may have a melt flow rate ratio (MFRR, $MFR_{21.6}/MFR_{2.16}$) ranging from about 35 to about 200, preferably about 80 to about 150. Since the olefin-based polymer of the present invention may have the melt flow rate ratio within the above range, flowability under each load may be properly controlled to improve processability and mechanical properties at the same time.

According to an embodiment of the present invention, $MFR_{2.16}$ (a melt flow rate measured in accordance with ASTM D-1238 at 190° C. under a load of 2.16 kg) may be in the range of about 0.1 to about 3 g/10 min, and preferably about 0.1 to about 0.8 g/10 min. Further, according to an embodiment of the present invention, $MFR_{21.6}$ (a melt flow rate measured in accordance with ASTM D-1238 at 190° C. under a load of 21.6 kg) may be in the range of about 5 to about 100 g/10 min, and preferably about 7 to about 60 g/10 min Such ranges of $MFR_{2.16}$ and $MFR_{21.6}$ may be properly controlled in consideration of use or application fields of the olefin-based polymer.

Further, the olefin-based polymer of the present invention has a slope in the range of about −0.8 to about −0.2 or about −0.6 to about −0.4 in a curve of complex viscosity ($\eta^*[Pa \cdot s]$) versus frequency ($\omega[rad/s]$). The curve of complex viscosity versus frequency is related to flowability, and a high complex viscosity at a low frequency and a low complex viscosity at a high frequency represent high flowability. That is, a negative slope and a higher absolute value of the slope may represent higher flowability. The olefin-based polymer of the present invention has a slope ranging from about −0.8 to about −0.2 in the curve of complex viscosity versus frequency, and it exhibits remarkably high flowability, compared to the previous olefin-based polymer having similar density and weight average molecular weight. For this reason, the polymer may have a superior shear thinning effect despite its high melt index, thereby showing excellent flowability and processability.

Figure 4:
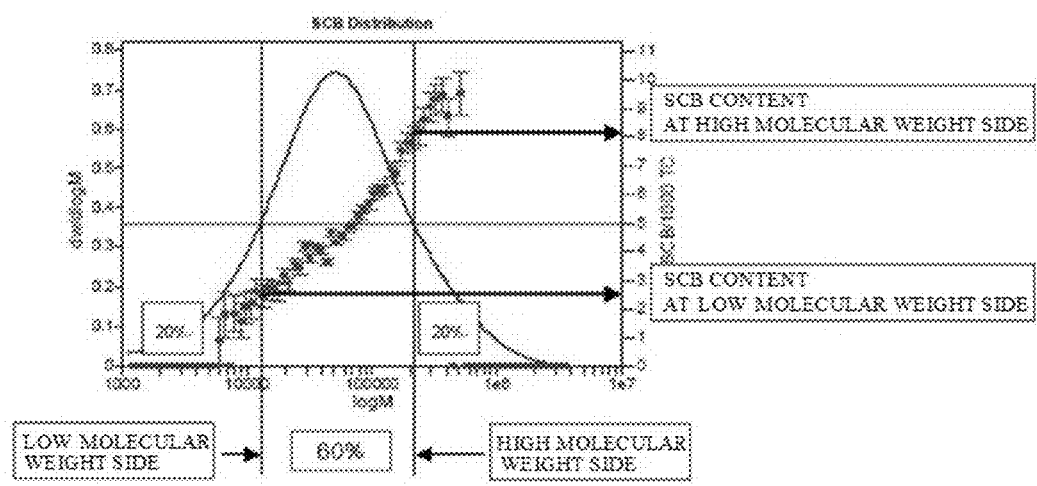
FIG. 4 is a graph showing an exemplary method of measuring a CI index using a molecular weight distribution curve.

Further, the olefin-based polymer of the present invention may have a CI (Co-monomer Incorporation) index of about 0.5 to about 5, or about 1 to about 3, or about 1 to about 1.5. The CI structure used herein means a new structure, in which comonomers such as alpha-olefin are incorporated predominantly in the high-molecular-weight main chain, that is, the amount of short chain branches (SCB) increases as the molecular weight increases. The molecular weight, molecular weight distribution, and SCB content may be measured at the same time by GPC-FTIR instrument, and CI index may be calculated based on the following Equation 1 by obtaining a molecular weight distribution curve by plotting a log value (log M) of a molecular weight (M) on the x-axis, and a molecular weight distribution (dwt/dlog M) with respect to the log value on the y-axis, and then measuring the SCB (Short Chain Branch) content (content of branches having 2 to 7 carbon atoms per 1,000 carbons, unit: branch/1,000 C) at the left and right borders of centered 60% area excluding 20% of the left and right ends in the total area. In this regard, the SCB content at high molecular weight side and the SCB content at low molecular weight side mean SCB content values at the left and right borders of centered 60% area, respectively. An example of the method of measuring CI (Co-monomer Incorporation) Index is as illustrated in FIG. 4.

CI Index=SCB content at high molecular weight side−SCB content at low molecular weight side/ SCB content at low molecular weight side [Equation 1]

When CI index is 0 or less, the polymer has no CI structure, and when CI index is more than 0, the polymer has the CI structure. It can be evaluated that as a polymer has higher value, it has more excellent CI characteristics.

According to an embodiment of the present invention, the density of the olefin-based polymer may be 0.930 to 0.950 g/cm$^3$, but is not limited thereto.

According to another embodiment of the present invention, the olefin-based polymer may have LCB (Long Chain Branch). The LCB (Long Chain Branch) means a side chain branch of 8 or more carbon atoms in the main chain of an olefin-based polymer, and the side chain branches are commonly produced when alpha-olefin such as 1-butene, 1-hexene, or 1-octene is used as a comonomer.

The presence of LCB in the olefin-based polymer may be generally determined by whether there is an inflection point or curves tend to diverge at the lower complex modulus in a van Gurp-Palmen plot measured by a rheometer. In the van Gurp-Palmen plot, the x-axis represents the absolute value of complex modulus and the y-axis represents phase angle.

Figure 2:
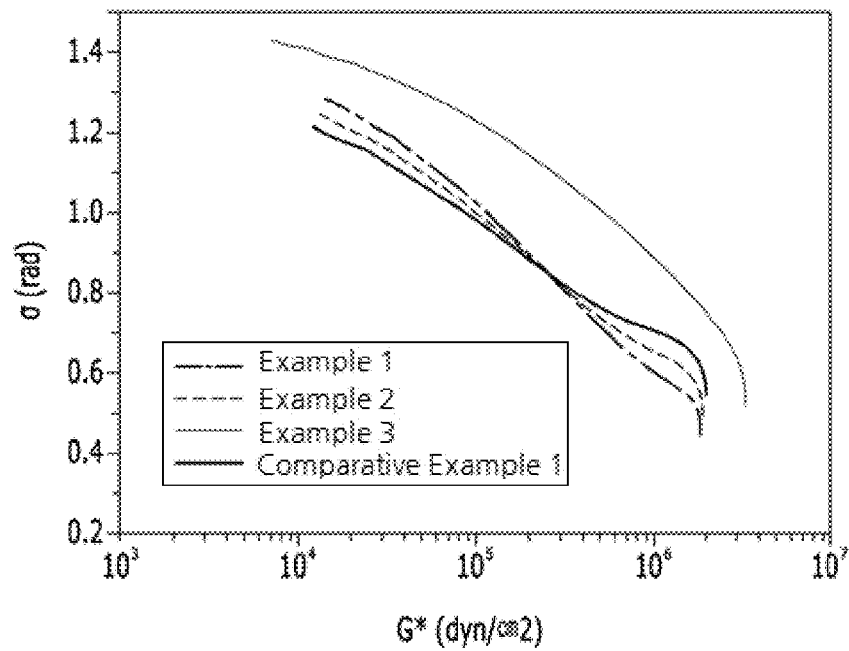
FIG. 2 is a van Gurp-Palmen plot of olefin-based polymers according to Examples and Comparative Examples of the present invention.
Figure 3:
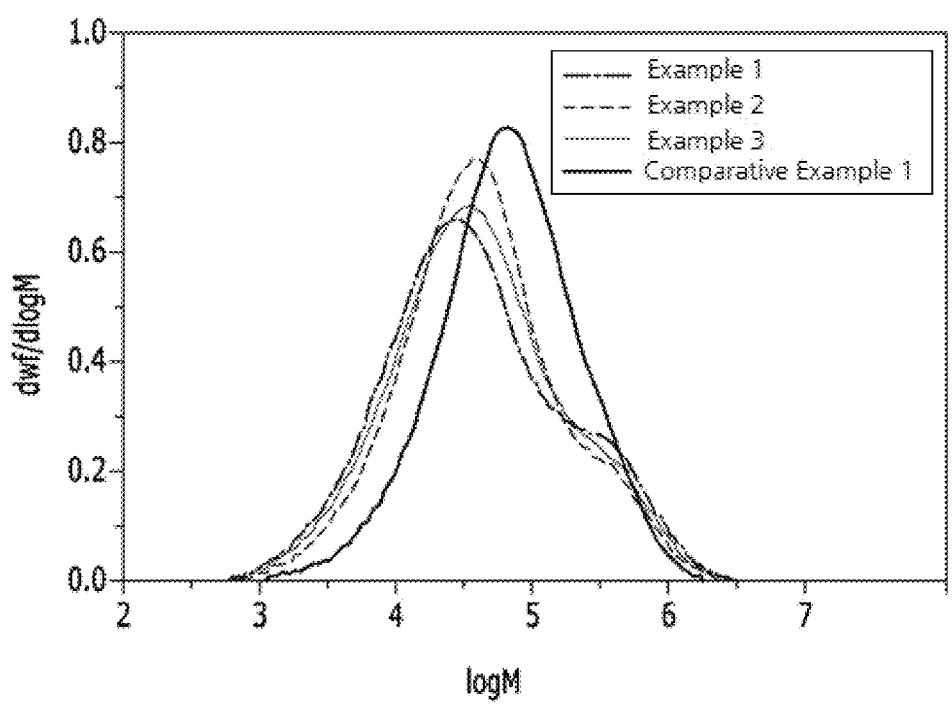
FIG. 3 is a GPC graph of olefin-based polymers according to Examples and Comparative Examples of the present invention.

Referring to FIG. 2 which shows a van Gurp-Palmen plot of the olefin-based polymer according to an embodiment of the present invention, Examples 1 and 2 show characteristics that phase angles tend to diverge at the lower complex modulus and the curves have an inflection point at the high complex modulus. These characteristics of the curves are attributed to LCB of the olefin-based polymer, and olefin-based polymers including LCB exhibit excellent swell, bubble stability, melt fracture, sagging time, etc., thereby being applied to various fields according to the intended use, in particular, providing a pipe with improved physical properties, etc.

Further, in the olefin-based polymer of the present invention, the LCB content per 1,000 carbons of olefin-based polymer may be 0.001 to 1, and preferably 0.01 to 0.1, and the maximum LCB content per 1,000 carbons may be 0.001 to 1, and preferably 0.01 to 0.1.

The olefin-based polymer according to the present invention may be a homopolymer of ethylene which is an olefin-based monomer, or preferably, a copolymer of ethylene and alpha olefin-based comonomer.

The alpha olefin-based comonomer may be alpha olefin having 4 or more carbon atoms. The alpha olefin having 4 or more carbon atoms may be 1-butene, 1-pentene, 1-hexene, 4-methyl-1-pentene, 1-octene, 1-decene, 1-dodecene, 1-tetradecene, 1-hexadecene, 1-octadecene, 1-eicosen, etc., but is not limited thereto. Among them, alpha olefin having 4~10 carbon atoms is preferred, and one kind or several kinds of alpha olefins may be also used together as comonomers.

In the copolymer of ethylene and alpha olefin-based comonomer, the content of the alpha olefin-based comonomer may be about 0.5% by weight to about 10% by weight, and preferably, about 1% by weight to about 5% by weight, but is not limited thereto.

The above olefin-based polymer may be prepared by using a hybrid supported metallocene catalyst.

The hybrid supported metallocene catalyst may be a hybrid supported metallocene catalyst including one or more first metallocene compounds represented by the following Chemical Formula 1; one or more second metallocene compounds selected from compounds represented by the following Chemical Formulae 3 to 5; a cocatalyst compound; and a support.

[Chemical Formula 1]

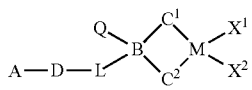

wherein A is hydrogen, halogen, a C1 to C20 alkyl group, a C2 to C20 alkenyl group, a C6 to C20 aryl group, a C7 to C20 alkylaryl group, a C7 to C20 arylalkyl group, a C1 to C20 alkoxy group, a C2 to C20 alkoxyalkyl group, a C3 to C20 heterocycloalkyl group, or a C5 to C20 heteroaryl group;

D is —O—, —S—, —N(R)— or —Si(R)(R')—, wherein R and R' are the same as or different from each other, and each independently hydrogen, halogen, a C1 to C20 alkyl group, a C2 to C20 alkenyl group, or a C6 to C20 aryl group;

L is a linear or branched C1 to C10 alkylene group;

B is carbon, silicon, or germanium;

Q is hydrogen, halogen, a C1 to C20 alkyl group, a C2 to C20 alkenyl group, a C6 to C20 aryl group, a C7 to C20 alkylaryl group, or a C7 to C20 arylalkyl group;

M is a Group 4 transition metal;

$X^1$ and $X^2$ are the same as or different from each other, and each independently halogen, a C1 to C20 alkyl group, a C2 to C20 alkenyl group, a C6 to C20 aryl group, a nitro group, an amido group, a C1 to C20 alkylsilyl group, a C1 to C20 alkoxy group, or a C1 to C20 sulfonate group;

$C^1$ and $C^2$ are the same as or different from each other, and each independently represented by one of the following Chemical Formula 2a, the following Chemical Formula 2b, or the following Chemical Formula 2c, excluding that both $C^1$ and $C^2$ are Chemical Formula 2c;

[Chemical Formula 2a]

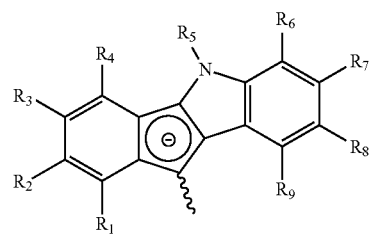

[Chemical Formula 2b]

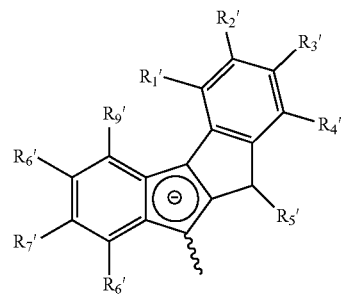

[Chemical Formula 2c]

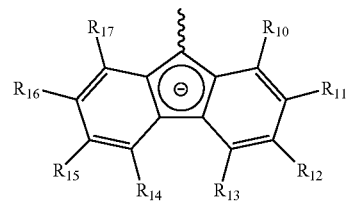

wherein R1 to R17 and R1' to R9' are the same as or different from each other, and each independently hydrogen, halogen, a C1 to C20 alkyl group, a C2 to C20 alkenyl group, a C1 to C20 alkylsilyl group, a C1 to C20 silylalkyl group, a C1 to C20 alkoxysilyl group, a C1 to C20 alkoxy group, a C6 to C20 aryl group, a C7 to C20 alkylaryl group, or a C7 to C20 arylalkyl group, and two or more adjacent groups of R10 to R17 are connected to each other to form substituted or unsubstituted aliphatic rings or aromatic rings;

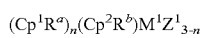 [Chemical Formula 3]

wherein $M^1$ is a Group 4 transition metal;

$Cp^1$ and $Cp^1$ are the same as or different from each other, and each independently any one selected from the group consisting of cyclopentadienyl, indenyl, 4,5,6,7-tetrahydro-1-indenyl, and fluorenyl radicals, each of which may be substituted with a hydrocarbon having 1 to 20 carbon atoms;

$R^a$ and $R^b$ are the same as or different from each other, and each independently hydrogen, C1 to C20 alkyl, C1 to C10 alkoxy, C2 to C20 alkoxyalkyl, C6 to C20 aryl, C6 to C10 aryloxy, C2 to C20 alkenyl, C7 to C40 alkylaryl, C7 to C40 arylalkyl, C8 to C40 arylalkenyl, or C2 to C10 alkynyl;

$Z^1$ is a halogen atom, C1 to C20 alkyl, C2 to C10 alkenyl, C7 to C40 alkylaryl, C7 to C40 arylalkyl, C6 to C20 aryl, substituted or unsubstituted C1 to C20 alkylidene, substituted or unsubstituted amino group, C2 to C20 alkylalkoxy, or C7 to C40 arylalkoxy;

n is 1 or 0;

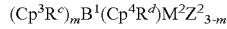 [Chemical Formula 4]

wherein $M^2$ is a Group 4 transition metal;

$Cp^3$ and $Cp^4$ are the same as or different from each other, and each independently any one selected from the group consisting of cyclopentadienyl, indenyl, 4,5,6,7-tetrahydro-1-indenyl, and fluorenyl radicals, each of which may be substituted with a hydrocarbon having 1 to 20 carbon atoms;

$R^c$ and $R^d$ are the same as or different from each other, and each independently hydrogen, C1 to C20 alkyl, C1 to C10 alkoxy, C2 to C20 alkoxyalkyl, C6 to C20 aryl, C6 to C10 aryloxy, C2 to C20 alkenyl, C7 to C40 alkylaryl, C7 to C40 arylalkyl, C8 to C40 arylalkenyl, or C2 to C10 alkynyl;

$Z^2$ is a halogen atom, C1 to C20 alkyl, C2 to C10 alkenyl, C7 to C40 alkylaryl, C7 to C40 arylalkyl, C6 to C20 aryl, substituted or unsubstituted C1 to C20 alkylidene, substituted or unsubstituted amino group, C2 to C20 alkylalkoxy, or C7 to C40 arylalkoxy;

$B^1$ is one or more of radicals containing a carbon, germanium, silicon, phosphorous, or nitrogen atom, which crosslink $Cp^3R^c$ ring to $Cp^4R^d$ ring or crosslink one $Cp^4R^d$ ring to $M^2$, or a combination thereof, and m is 1 or 0;

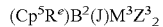 [Chemical Formula 5]

wherein $M^3$ is a Group 4 transition metal;

$Cp^5$ is any one selected from the group consisting of cyclopentadienyl, indenyl, 4,5,6,7-tetrahydro-1-indenyl and fluorenyl radicals, each of which may be substituted with a hydrocarbon having 1 to 20 carbon atoms;

$R^e$ is hydrogen, C1 to C20 alkyl, C1 to C10 alkoxy, C2 to C20 alkoxyalkyl, C6 to C20 aryl, C6 to C10 aryloxy, C2 to C20 alkenyl, C7 to C40 alkylaryl, C7 to C40 arylalkyl, C8 to C40 arylalkenyl, or C2 to C10 alkynyl;

$Z^3$ is a halogen atom, C1 to C20 alkyl, C2 to C10 alkenyl, C7 to C40 alkylaryl, C7 to C40 arylalkyl, C6 to C20 aryl, substituted or unsubstituted C1 to C20 alkylidene, substituted or unsubstituted amino group, C2 to C20 alkylalkoxy, or C7 to C40 arylalkoxy;

$B^2$ is one or more of radicals containing a carbon, germanium, silicon, phosphorous or nitrogen atom, which crosslink $Cp^5R^e$ ring to J, or a combination thereof; and J is any one selected from the group consisting of $NR^f$, O, $PR^f$ and S, wherein $R^f$ is C1-C20 alkyl, aryl, substituted alkyl, or substituted aryl.

In the hybrid supported metallocene catalyst according to the present invention, the substituents of Chemical Formulae 1, 3, 4 and 5 will be more specifically explained as follows.

The C1 to C20 alkyl group may include a linear or branched alkyl group, and specifically, it may be exemplified by a methyl group, an ethyl group, a propyl group, an isopropyl group, an n-butyl group, a tert-butyl group, a pentyl group, a hexyl group, a heptyl group, an octyl group or the like, but is not limited thereto.

The C2 to C20 alkenyl group may include a linear or branched alkenyl group, and specifically, it may be exemplified by an allyl group, an ethenyl group, a propenyl group, a butenyl group, a pentenyl group or the like, but is not limited thereto.

The C6 to C20 aryl group may include a single ring aryl group or a condensed ring aryl group, and specifically, it may be exemplified by a phenyl group, a biphenyl group, a naphthyl group, a phenanthrenyl group, a fluorenyl group or the like, but is not limited thereto.

The C5 to C20 heteroaryl group may include a single ring heteroaryl group or a condensed ring heteroaryl group, and specifically, it may be exemplified by a carbazolyl group, a pyridyl group, a quinoline group, an isoquinoline group, a thiophenyl group, a furanyl group, an imidazole group, an oxazolyl group, a thiazolyl group, a triazine group, a tetrahydropyranyl group, a tetrahydrofuranyl group or the like, but is not limited thereto.

The C1 to C20 alkoxy group may include a methoxy group, an ethoxy group, a phenyloxy group, a cyclohexyloxy group or the like, but is not limited thereto.

The Group 4 transition metal may include titanium, zirconium, hafnium or the like, but is not limited thereto.

In the hybrid supported metallocene catalyst according to the present invention, it is more preferable that R1 to R17 and R1' to R9' in Chemical Formulae 2a, 2b and 2c are each independently hydrogen, a methyl group, an ethyl group, a propyl group, an isopropyl group, an n-butyl group, a tert-butyl group, a pentyl group, a hexyl group, a heptyl group, an octyl group, a phenyl group, a halogen group, a trimethylsilyl group, a triethylsilyl group, a tripropylsilyl group, a tributylsilyl group, a triisopropylsilyl group, a trimethylsilylmethyl group, a methoxy group, or an ethoxy group, but it is not limited thereto.

It is more preferable that L in Chemical Formula 1 is a linear or branched C4 to C8 alkylene group, but it is not limited thereto. Furthermore, the alkylene group may be unsubstituted or substituted with a C1 to C20 alkyl group, a C2 to C20 alkenyl group, or a C6 to C20 aryl group.

Further, it is preferable that A in Chemical Formula 1 is hydrogen, a methyl group, an ethyl group, a propyl group, an isopropyl group, an n-butyl group, a tert-butyl group, a methoxymethyl group, a tert-butoxymethyl group, a 1-ethoxyethyl group, a 1-methyl-1-methoxyethyl group, a tetrahydropyranyl group, or a tetrahydrofuranyl group, but it is not limited thereto.

Further, it is preferable that B in Chemical Formula 1 is silicon, but it is not limited thereto.

Since the first metallocene compound of Chemical Formula 1 forms a structure in which an indenoindole derivative and/or a fluorene derivative are crosslinked via a bridge and has an unshared electron pair capable of acting as a Lewis base in the ligand structure, it is supported on the surface of a support having a Lewis acid character to show a high polymerization activity even when supported. Furthermore, it is superior in activity because of including the electron-rich indenoindole group and/or fluorene group. In addition, due to a proper steric hindrance and an electronic effect of the ligand, it is low in hydrogen reactivity and also maintains a high activity even in the presence of hydrogen. Further, it may be used for preparing an olefin-based polymer of an ultra-high molecular weight because the nitrogen atom of the indenoindole derivative stabilizes the beta-hydrogen of a growing polymer chain by a hydrogen bond to inhibit beta-hydrogen elimination.

According to one embodiment of the present invention, a specific example of the compound represented by Chemical Formula 2a may include a compound represented by any one of the following structural formulae, but it is not limited thereto:

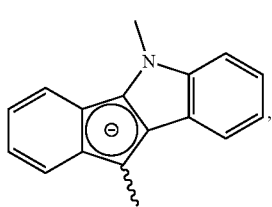
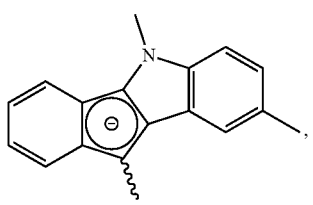
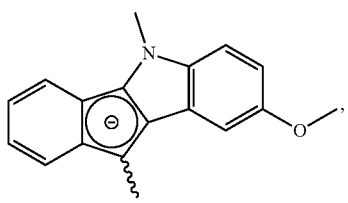
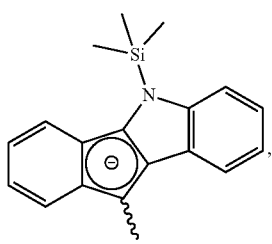
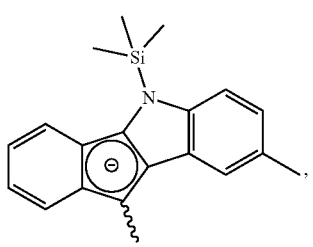
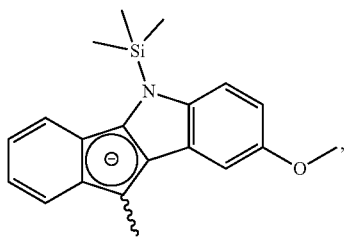
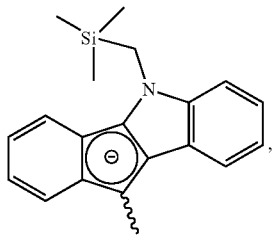
-continued
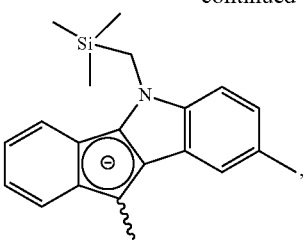
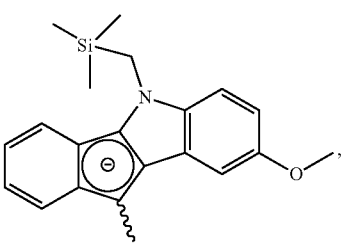
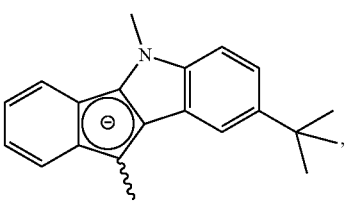
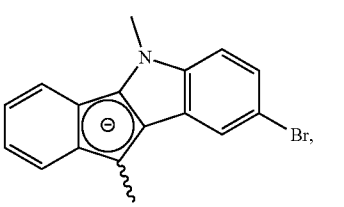
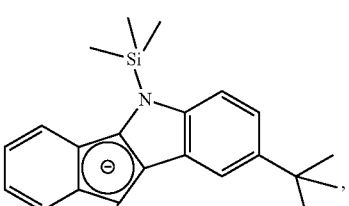
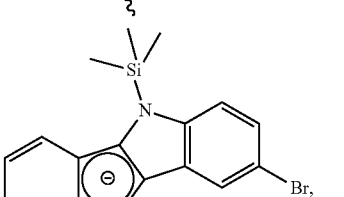
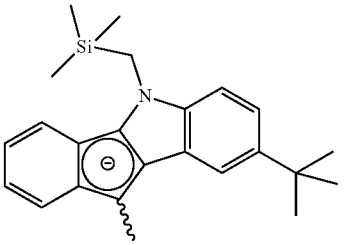
and

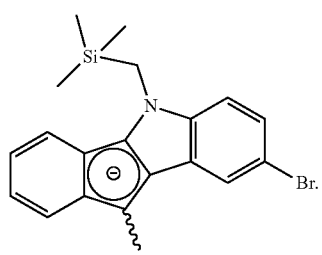
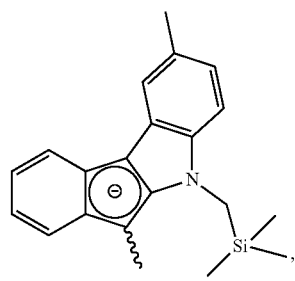
According to one embodiment of the present invention, a specific example of the compound represented by Chemical Formula 2b may include a compound represented by any one of the following structural formulae, but it is not limited thereto:
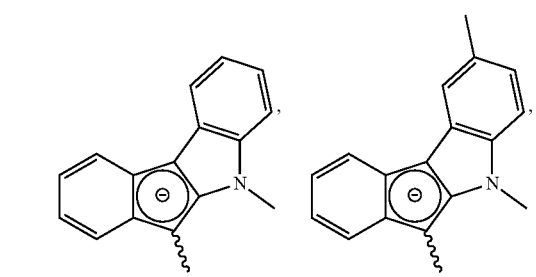
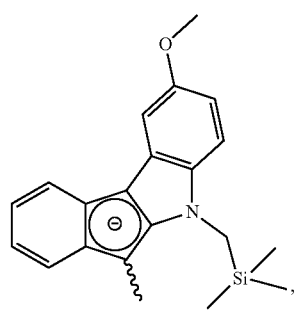
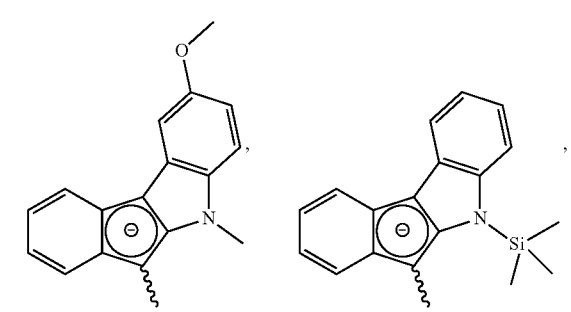
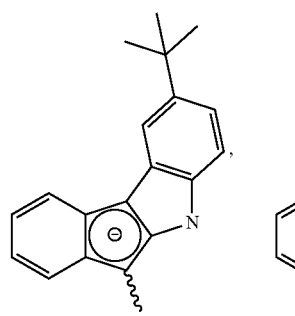
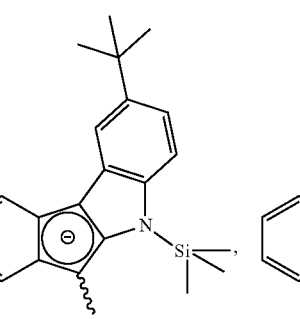
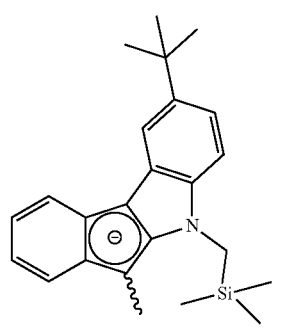
and -continued

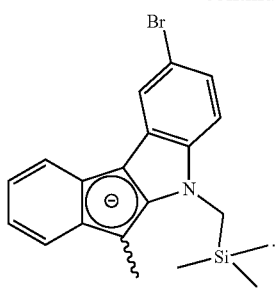

According to one embodiment of the present invention, a specific example of the compound represented by Chemical Formula 2c may include a compound represented by any one of the following structural formulae, but it is not limited thereto:

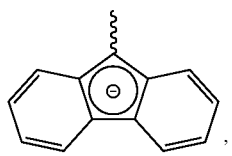

,

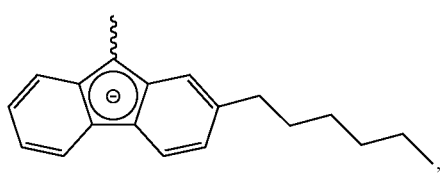

,

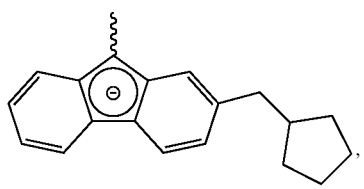

,

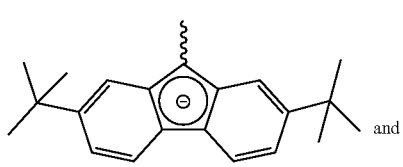

and

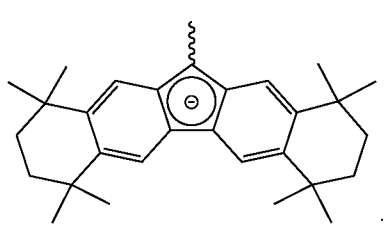

.

According to one embodiment of the present invention, a specific example of the first metallocene compound represented by Chemical Formula 1 may include a compound represented by any one of the following structural formulae, but it is not limited thereto:

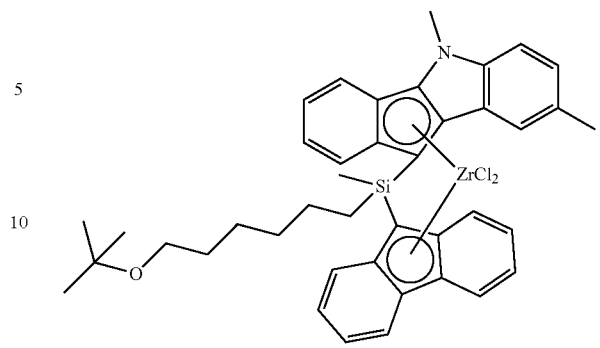

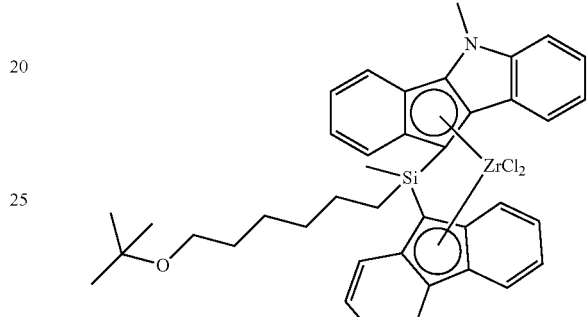

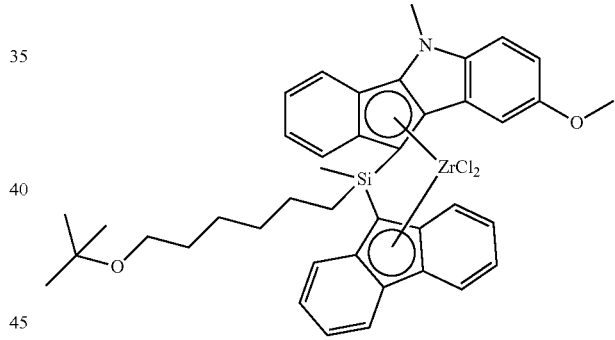

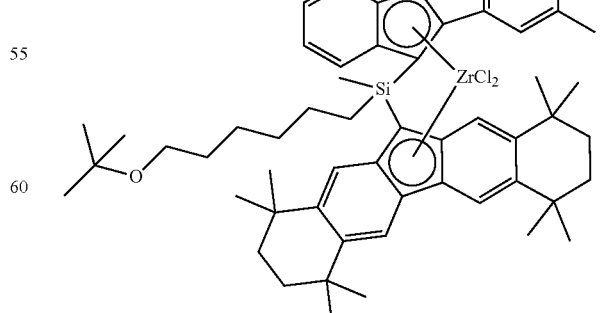

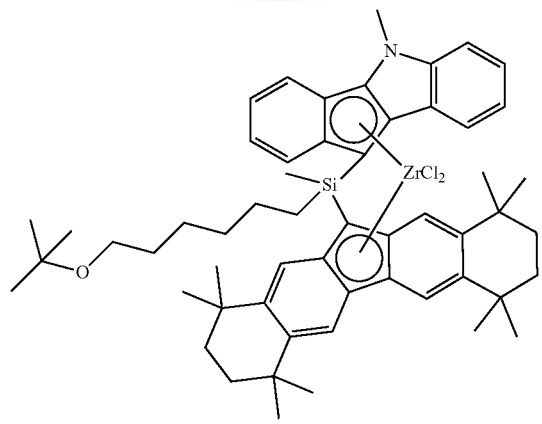
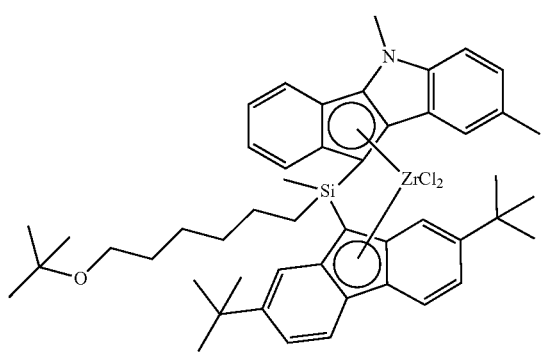
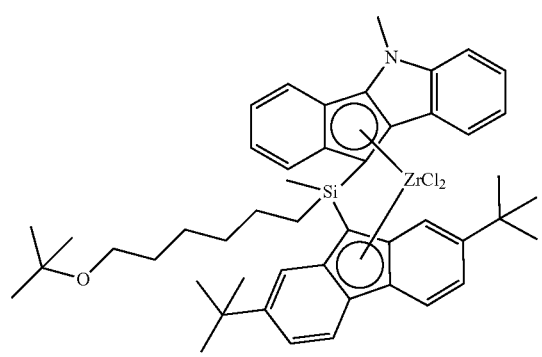
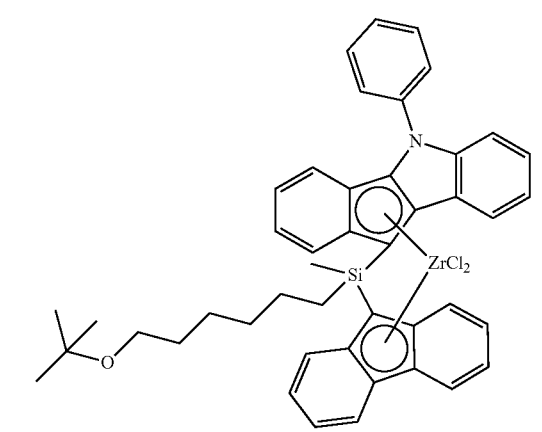
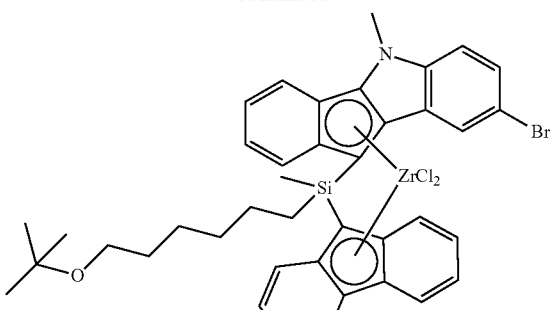
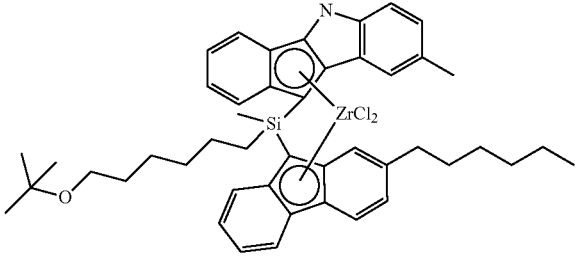
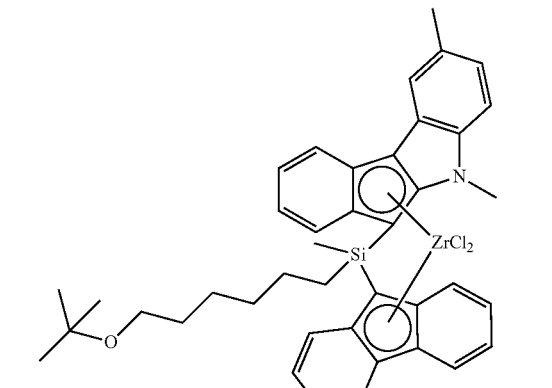
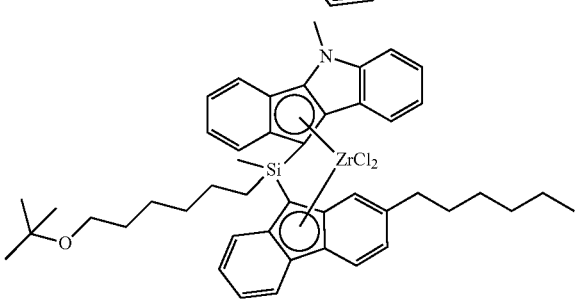
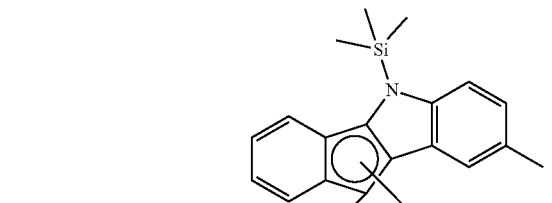
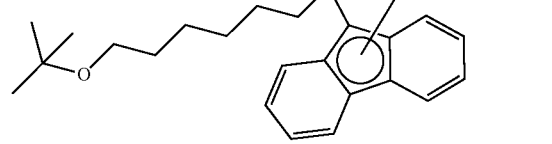

-continued
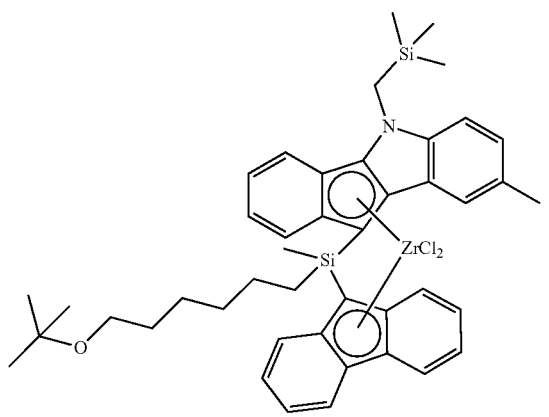
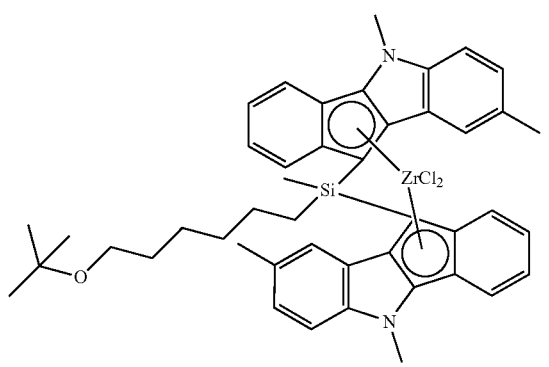
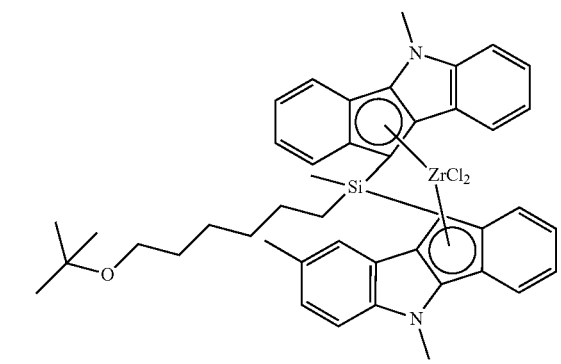
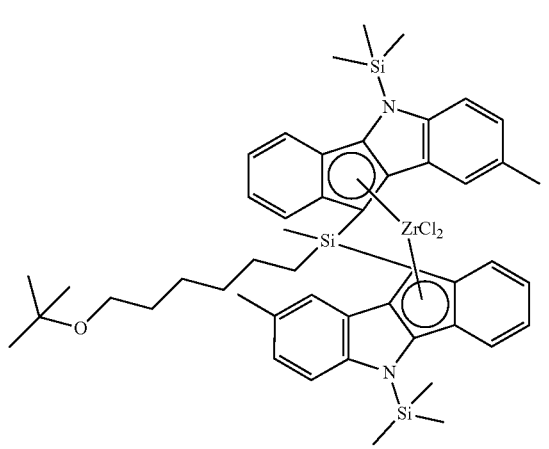
-continued
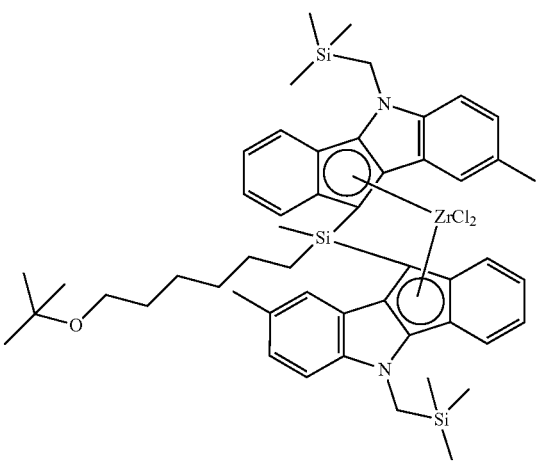
and
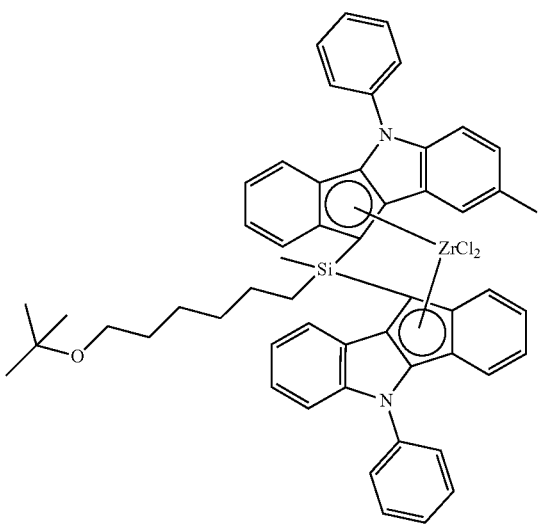
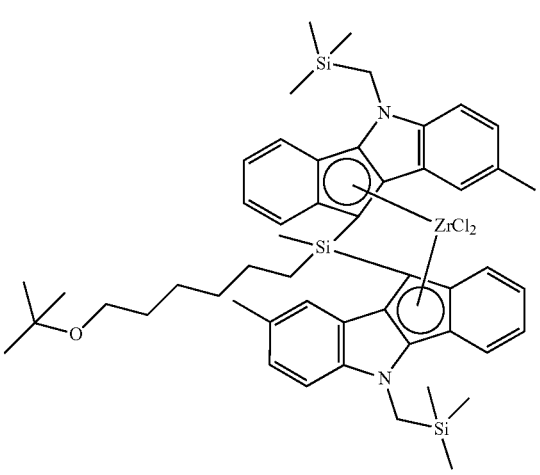
and

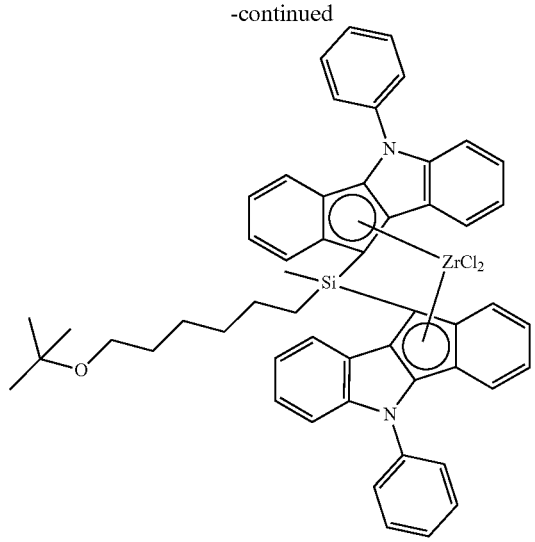

The first metallocene compound of Chemical Formula 1 may have a superior activity and may polymerize an olefin-based polymer having a high molecular weight. In particular, it may show a high polymerization activity even when it is used in the state of being supported on a support. Therefore, it may prepare a polyolefin-based polymer having an ultra-high molecular weight.

Also, even when the polymerization reaction is carried out in the presence of hydrogen in order to prepare an olefin-based polymer having a high molecular weight and a broad molecular weight distribution at the same time, the first metallocene compound of Chemical Formula 1 according to the present invention shows a low hydrogen reactivity, thereby polymerizing an olefin-based polymer of an ultra-high molecular weight still with high activity. Therefore, although it is used as a hybrid with a catalyst having different characteristics, it may prepare an olefin-based polymer satisfying the characteristic of high molecular weight without reduction in its activity, resulting in the easy preparation of an olefin-based polymer having a high molecular weight and also having a broad molecular weight distribution.

The first metallocene compound of Chemical Formula 1 may be obtained by connecting an indenoindole derivative and/or a fluorene derivative via a bridge compound to prepare a ligand compound, and then introducing a metal precursor compound therein to perform a metallation. The method of preparing the first metallocene compound will be specifically explained in the examples to be described below.

In the supported catalyst of the present invention, the second metallocene compound may be one or more selected from compounds represented by the following Chemical Formulae 3 to 5:

$$(Cp^1R^a)_n(Cp^2R^b)M^1Z^1_{3-n}$$ [Chemical Formula 3]

wherein $M^1$ is a Group 4 transition metal;

$Cp^1$ and $Cp^1$ are the same as or different from each other, and each independently any one selected from the group consisting of cyclopentadienyl, indenyl, 4,5,6,7-tetrahydro-1-indenyl, and fluorenyl radicals, each of which may be substituted with a hydrocarbon having 1 to 20 carbon atoms;

$R^a$ and $R^b$ are the same as or different from each other, and each independently hydrogen, C1 to C20 alkyl, C1 to C10 alkoxy, C2 to C20 alkoxyalkyl, C6 to C20 aryl, C6 to C10 aryloxy, C2 to C20 alkenyl, C7 to C40 alkylaryl, C7 to C40 arylalkyl, C8 to C40 arylalkenyl, or C2 to C10 alkynyl;

$Z^1$ is a halogen atom, C1 to C20 alkyl, C2 to C10 alkenyl, C7 to C40 alkylaryl, C7 to C40 arylalkyl, C6 to C20 aryl, substituted or unsubstituted C1 to C20 alkylidene, substituted or unsubstituted amino group, C2 to C20 alkylalkoxy, or C7 to C40 arylalkoxy;

n is 1 or 0;

$$(Cp^3R^c)_mB^1(Cp^4R^d)M^2Z^2_{3-m}$$ [Chemical Formula 4]

wherein $M^2$ is a Group 4 transition metal;

$Cp^3$ and $Cp^4$ are the same as or different from each other, and each independently any one selected from the group consisting of cyclopentadienyl, indenyl, 4,5,6,7-tetrahydro-1-indenyl, and fluorenyl radicals, each of which may be substituted with a hydrocarbon having 1 to 20 carbon atoms;

$R^c$ and $R^d$ are the same as or different from each other, and each independently hydrogen, C1 to C20 alkyl, C1 to C10 alkoxy, C2 to C20 alkoxyalkyl, C6 to C20 aryl, C6 to C10 aryloxy, C2 to C20 alkenyl, C7 to C40 alkylaryl, C7 to C40 arylalkyl, C8 to C40 arylalkenyl, or C2 to C10 alkynyl;

$Z^2$ is a halogen atom, C1 to C20 alkyl, C2 to C10 alkenyl, C7 to C40 alkylaryl, C7 to C40 arylalkyl, C6 to C20 aryl, substituted or unsubstituted C1 to C20 alkylidene, substituted or unsubstituted amino group, C2 to C20 alkylalkoxy, or C7 to C40 arylalkoxy;

$B^1$ is one or more of radicals containing a carbon, germanium, silicon, phosphorous, or nitrogen atom, which crosslink $Cp^3R^c$ ring to $Cp^4R^d$ ring or crosslink one $Cp^4R^d$ ring to $M^2$, or a combination thereof, and m is 1 or 0;

$$(Cp^5R^e)B^2(J)M^3Z^3_2$$ [Chemical Formula 5]

wherein $M^3$ is a Group 4 transition metal;

$Cp^5$ is any one selected from the group consisting of cyclopentadienyl, indenyl, 4,5,6,7-tetrahydro-1-indenyl and fluorenyl radicals, each of which may be substituted with a hydrocarbon having 1 to 20 carbon atoms;

$R^e$ is hydrogen, C1 to C20 alkyl, C1 to C10 alkoxy, C2 to C20 alkoxyalkyl, C6 to C20 aryl, C6 to C10 aryloxy, C2 to C20 alkenyl, C7 to C40 alkylaryl, C7 to C40 arylalkyl, C8 to C40 arylalkenyl, or C2 to C10 alkynyl;

$Z^3$ is a halogen atom, C1 to C20 alkyl, C2 to C10 alkenyl, C7 to C40 alkylaryl, C7 to C40 arylalkyl, C6 to C20 aryl, substituted or unsubstituted C1 to C20 alkylidene, substituted or unsubstituted amino group, C2 to C20 alkylalkoxy, or C7 to C40 arylalkoxy;

$B^2$ is one or more of radicals containing a carbon, germanium, silicon, phosphorous or nitrogen atom, which crosslink $Cp^5R^e$ ring to J, or a combination thereof; and J is any one selected from the group consisting of $NR^f$, O, $PR^f$ and S, wherein $R^f$ is C1 to C20 alkyl, aryl, substituted alkyl, or substituted aryl.

In Chemical Formula 4, when m is 1, it means a bridge compound structure, in which $Cp^3R^c$ ring and $Cp^4R^d$ ring or $Cp^4R^d$ ring and $M^2$ are crosslinked via $B^1$. When m is 0, it means a non-crosslinked compound structure.

The compound represented by Chemical Formula 3 may be exemplified by a compound represented by any one of the following structural formulae, but it is not limited thereto:

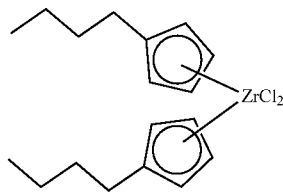

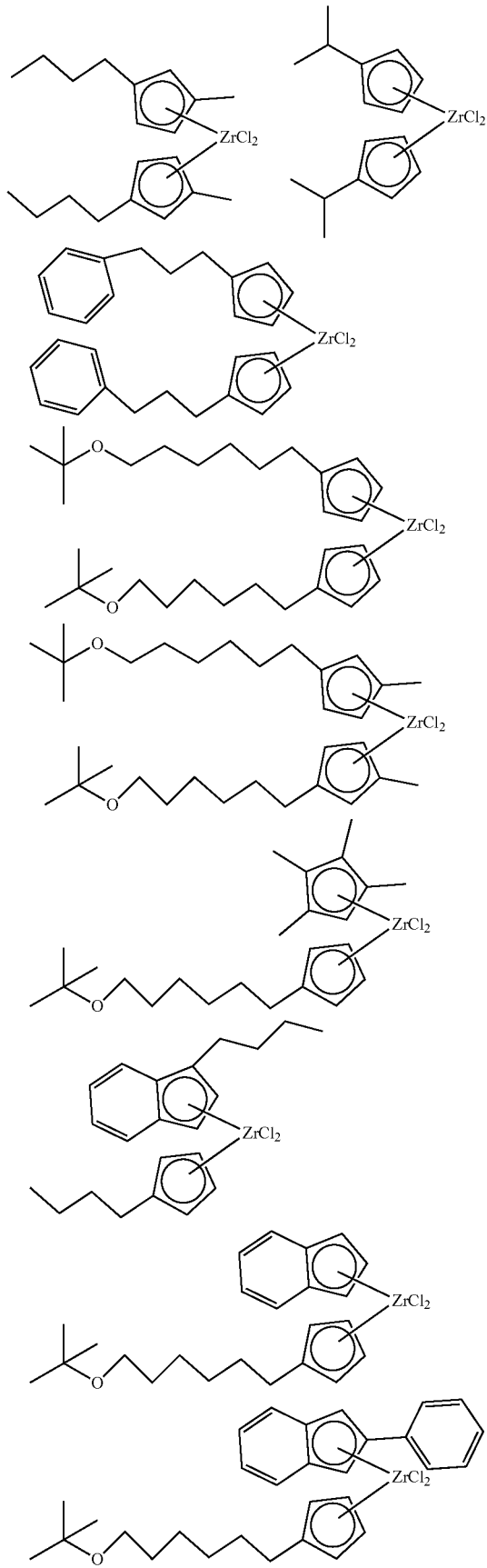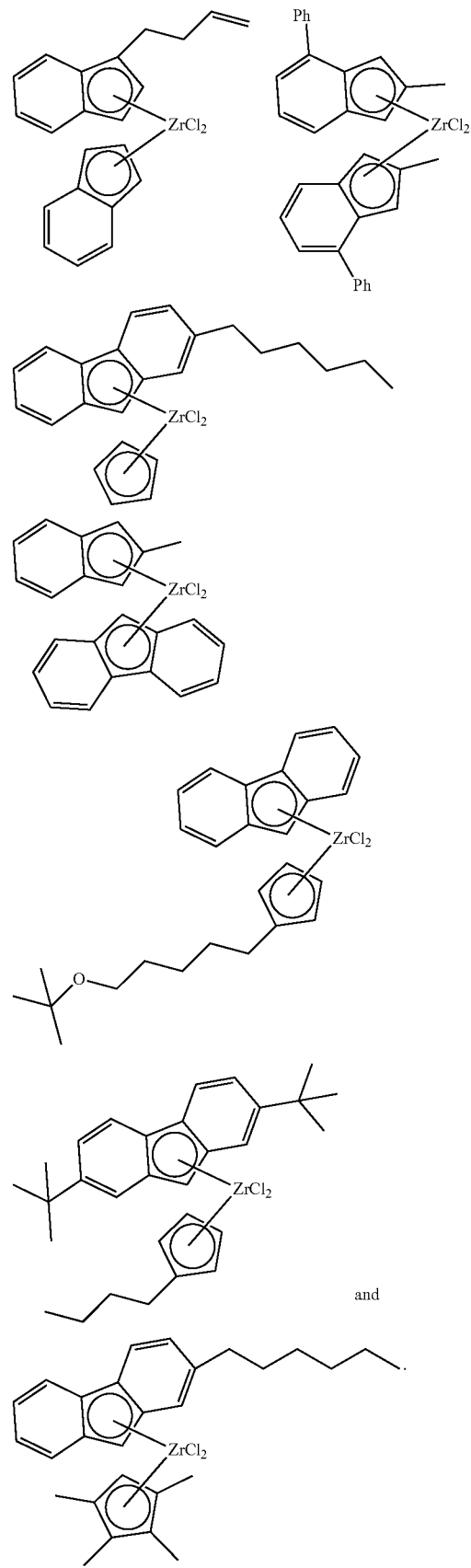

The compound represented by Chemical Formula 4 may be exemplified by a compound represented by any one of the following structural formulae, but it is not limited thereto:
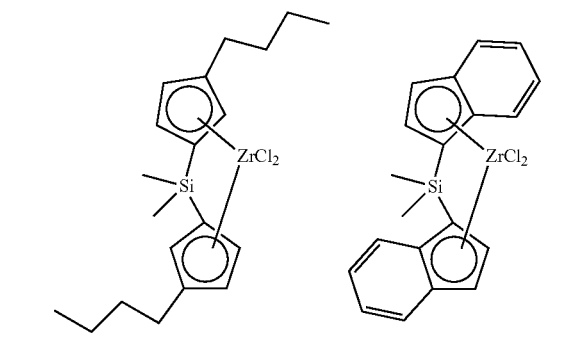
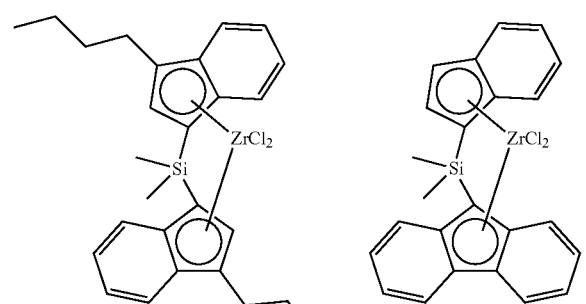
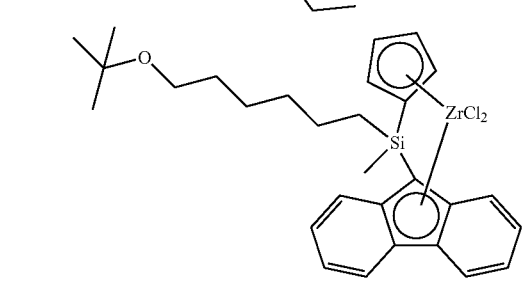
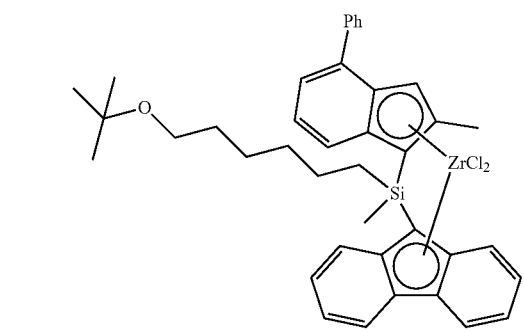
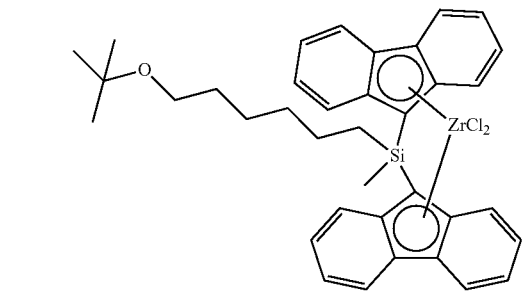
-continued
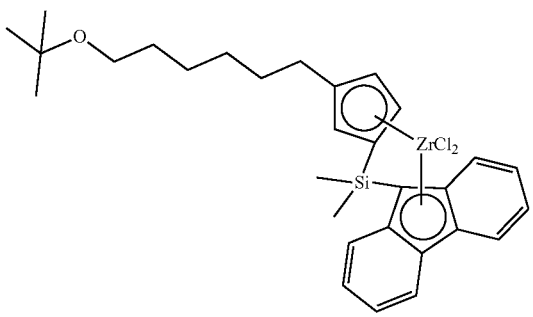
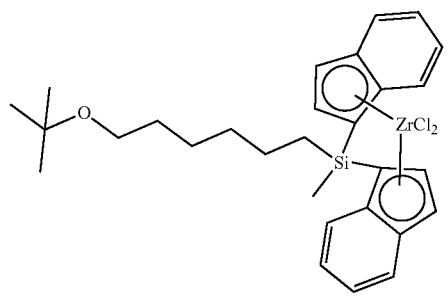
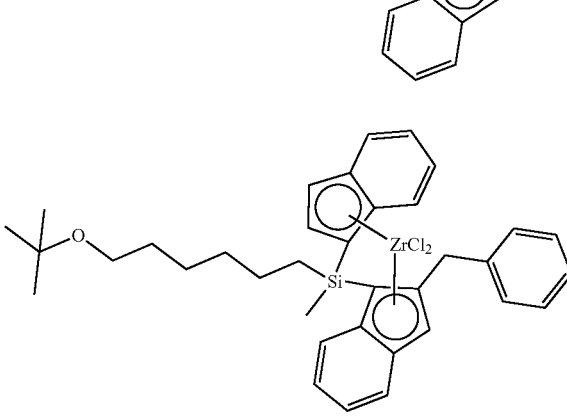
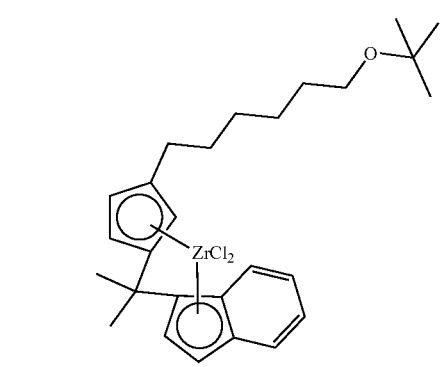
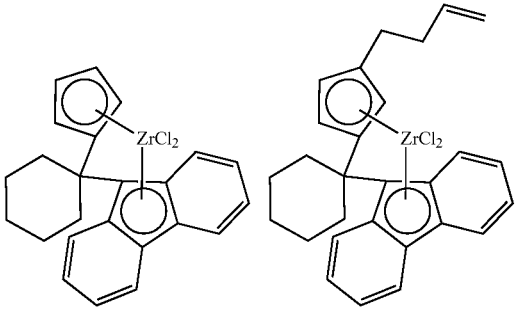 and -continued

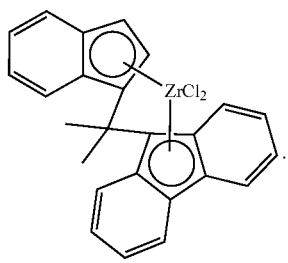

Further, the compound represented by Chemical Formula 5 may be exemplified by a compound represented by any one of the following structural formulae, but it is not limited thereto:

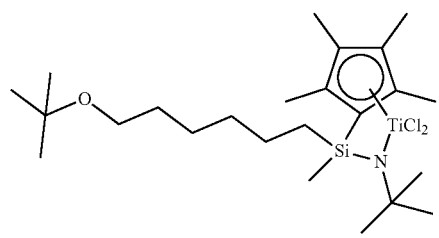

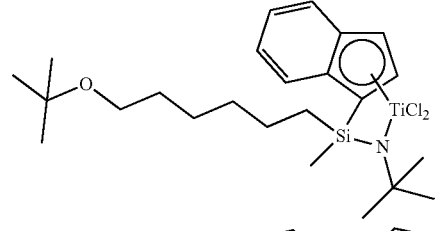

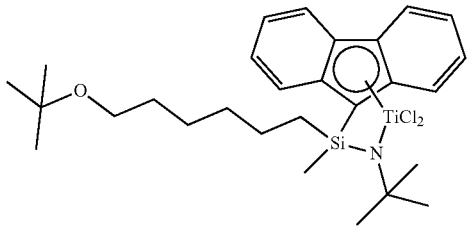

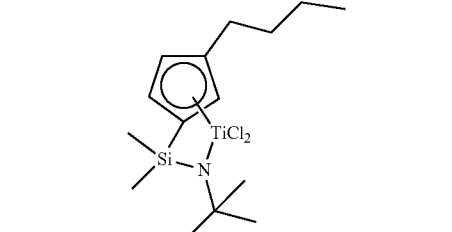

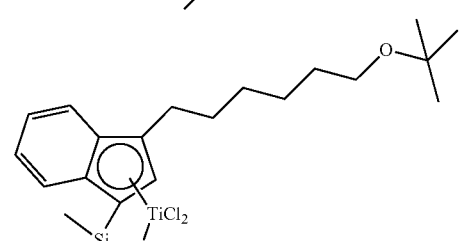

-continued

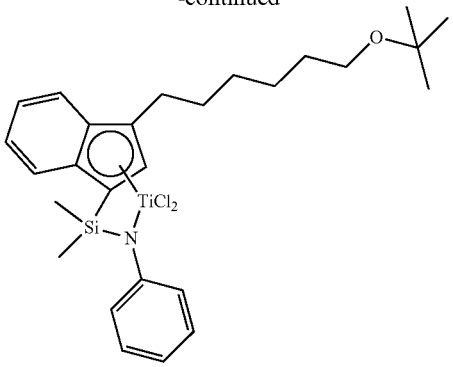

The hybrid supported metallocene catalyst according to the present invention is prepared by supporting one or more first metallocene compounds represented by Chemical Formula 1 and one or more second metallocene compounds selected from the compounds represented by Chemical Formula 3 to Chemical Formula 5 on a support together with a cocatalyst compound.

Particularly, in the hybrid supported metallocene catalyst, the first metallocene compound represented by Chemical Formula 1 may mainly contribute to preparation of copolymers having a high molecular weight, and the second metallocene compound represented by Chemical Formulae 3 to 5 may mainly contribute to preparation of copolymers having a low molecular weight. Therefore, when an olefin-based polymer is prepared by using the hybrid supported catalyst including two or more metallocene compounds, both copolymers having a high molecular weight and a low molecular weight may be prepared, thereby preparing olefin-based copolymers having a broader molecular weight distribution and excellent processability.

Further, the hybrid supported metallocene catalyst may induce production of LCB (Long Chain Branch) in an olefin-based polymer to be prepared, and therefore, the olefin-based polymer includes LCB (Long Chain Branch) having side chain branches of 8 or more carbon atoms in the main chain.

According to one embodiment of the present invention, the hybrid supported metallocene catalyst may include one or more first metallocene compounds of Chemical Formula 1 and one or more second metallocene compounds of Chemical Formula 3.

According to another embodiment of the present invention, the hybrid supported metallocene catalyst may include one or more second metallocene compounds of Chemical Formula 4 or Chemical Formula 5, in addition to one or more first metallocene compounds of Chemical Formula 1 and one or more second metallocene compounds of Chemical Formula 3.

In the hybrid supported metallocene catalyst according to the present invention, since the first metallocene compound forms a ligand structure, in which an indenoindole derivative and a fluorene derivative are crosslinked via a bridge compound, and has an unshared electron pair capable of acting as a Lewis base in the ligand structure, it is supported on the surface of a support having a Lewis acid character to show a high polymerization activity even when supported. Furthermore, it is superior in activity because of including the electron-rich indenoindole group and/or fluorene group. In addition, due to a proper steric hindrance and an electronic effect of the ligand, it is low in hydrogen reactivity and also maintains a high activity even in the presence of hydrogen. Therefore, when a hybrid supported metallocene catalyst is prepared using such a transition metal compound, an olefinic polymer having an ultra-high molecular weight may be obtained because the nitrogen atom of the indenoindole derivative stabilizes the beta-hydrogen of a growing polymer chain by a hydrogen bond.

Further, the hybrid supported metallocene catalyst of the present invention includes the first metallocene compound represented by Chemical Formula 1 and the second metallocene compound selected from the compounds represented by Chemical Formula 3 to Chemical Formula 5. Thus, as the hybrid supported metallocene catalyst includes two or more different types of the metallocene compounds, it is possible to prepare an olefin-based copolymer having LCB (Long Chain Branch) and a high molecular weight and also having excellent physical property and processability due to its broad molecular weight distribution.

In the hybrid supported metallocene catalyst according to the present invention, the cocatalyst which is supported together on a support to activate the metallocene compound is an organic metal compound containing a Group 13 metal. The cocatalyst compound is not particularly limited as long as it may be used for the polymerization of olefin in the presence of a general metallocene catalyst.

Specifically, the cocatalyst compound may include one or more of the first aluminum-containing cocatalyst of the following Chemical Formula 6 and the second borate-based cocatalyst of the following Chemical Formula 7:

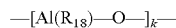  [Chemical Formula 6]

wherein $R_{18}$ is each independently halogen, or a halogen-substituted or unsubstituted hydrocarbyl group having 1 to 20 carbon atoms, and k is an integer of 2 or more,

 [Chemical Formula 7]

wherein $T^+$ is a monovalent polyatomic ion, B is boron in an oxidation state of +3, and G is each independently selected from the group consisting of a hydride group, a dialkylamido group, a halide group, an alkoxide group, an aryloxide group, a hydrocarbyl group, a halocarbyl group and a halo-substituted hydrocarbyl group, in which G has 20 or less carbon atoms, provided that G is a halide group at one or less position.

By using the above first and second cocatalysts, the molecular weight distribution of the polyolefins finally prepared may become more uniform while the polymerization activity may be enhanced.

The first cocatalyst of Chemical Formula 6 may be an alkylaluminoxane-based compound, in which repeating units are combined into a linear, circular or network structure. Specific examples of the first cocatalyst include methylaluminoxane (MAO), ethylaluminoxane, isobutylaluminoxane, butylaluminoxane or the like.

Further, the second cocatalyst of Chemical Formula 7 may be a borate-based compound in the form of a trisubstituted ammonium salt, a dialkyl ammonium salt, or a trisubstituted phosphonium salt. Specific examples of the second cocatalyst include a borate-based compound in the form of a trisubstituted ammonium salt such as trimethylammonium tetraphenylborate, methyldioctadecylammonium tetraphenylborate, triethylammonium tetraphenylborate, tripropylammonium tetraphenylborate, tri(n-butyl) ammonium tetraphenylborate, methyltetradecyclooctadecylammonium tetraphenylborate, N,N-dimethylanilium tetraphenylborate, N,N-diethylanilium tetraphenylborate, N,N-dimethyl(2,4,6-trimethylanilium)tetraphenylborate, trimethylammonium tetrakis(pentafluorophenyl)borate, methylditetradecylammonium tetrakis(pentaphenyl)borate, methyldioctadecylammonium tetrakis(pentafluorophenyl)borate, triethylammonium tetrakis(pentafluorophenyl)borate, tripropylammoniumtetrakis(pentafluorophenyl)borate, tri(n-butyl)ammonium tetrakis(pentafluorophenyl)borate, tri(secondary-butyl)ammoniumtetrakis(pentafluorophenyl)borate, N,N-dimethylanilium tetrakis(pentafluorophenyl)borate, N,N-diethylaniliumtetrakis(pentafluorophenyl)borate, N,N-dimethyl(2,4,6-trimethylanilium)tetrakis(pentafluorophenyl)borate, trimethylammoniumtetrakis(2, 3, 4, 6-tetrafluorophenyl)borate, triethylammonium tetrakis (2,3,4,6-tetrafluorophenyl)borate, tripropylammonium tetrakis(2,3,4,6-tetrafluorophenyl)borate, tri(n-butyl) ammonium tetrakis(2,3,4,6-, tetrafluorophenyl)borate, dimethyl(t-butyl)ammonium tetrakis(2,3,4,6-tetrafluorophenyl)borate, N,N-dimethylanilium tetrakis(2,3,4,6-tetrafluorophenyl)borate, N,N-diethylanilium tetrakis(2,3,4,6-tetrafluorophenyl)borate, N,N-dimethyl-(2,4,6-trimethylanilium)tetrakis-(2,3,4,6-tetrafluorophenyl)borate or the like; a borate-based compound in the form of a dialkylammonium salt such as dioctadecylammonium tetrakis(pentafluorophenyl)borate, ditetradecylammonium tetrakis(pentafluorophenyl)borate, dicyclohexylammonium tetrakis(pentafluorophenyl)borate or the like; or a borate-based compound in the form of a trisubstituted phosphonium salt such as triphenylphosphonium tetrakis(pentafluorophenyl)borate, methyldioctadecylphosphonium tetrakis(pentafluorophenyl)borate or tri(2,6-dimethylphenyl)phosphonium tetrakis(pentafluorophenyl)borate or the like.

In the hybrid supported metallocene catalyst according to the present invention, a weight ratio of the total transition metals included in the first metallocene compound represented by Chemical Formula 1 and the second metallocene compounds represented by Chemical Formulae 3 to 5 to the support may be 1:10 to 1:1,000. When the catalyst includes the support and the metallocene compounds in the above weight ratio, the optimum shape may be provided.

Further, a weight ratio of the cocatalyst compound to the support may be 1:1 to 1:100. Furthermore, the weight ratio of the first metallocene compound represented by Chemical Formula 1 to the second metallocene compounds represented by Chemical Formulae 3 to 5 may be 10:1 to 1:10, and preferably 5:1 to 1:5. When the catalyst includes the cocatalyst and the metallocene compounds in the above ratio, it is possible to optimize the activity and the polymer microstructure.

In the hybrid supported metallocene catalyst according to the present invention, a support including a hydroxyl group on its surface may be used as the support, and preferably, a support including a highly reactive hydroxyl group and siloxane group, of which surface is dried to remove moisture, may be used.

For example, silica, silica-alumina, and silica-magnesia that are dried at a high temperature may be used, and they may usually include oxides, carbonates, sulfates, and nitrates such as $Na_2O$, $K_2CO_3$, $BaSO_4$, and $Mg(NO_3)_2$ or the like.

The support is preferably dried at 200° C. to 800° C., more preferably at 300° C. to 600° C., and most preferably at 300° C. to 400° C. If the drying temperature of the support is lower than 200° C., it retains moisture too much so that moisture on the surface reacts with the cocatalyst. If the drying temperature is higher than 800° C., pores on the surface of the support are combined with each other to reduce surface area, and many hydroxyl groups are lost on the surface to remain only siloxane groups. Thus, the reactive sites with cocatalyst are reduced, which is not preferable.

The amount of hydroxyl group on the surface of the support is preferably 0.1 to 10 mmol/g, and more preferably 0.5 to 5 mmol/g. The amount of hydroxyl group on the surface of the support may be controlled depending on the preparation method and conditions of the support, or drying conditions, for example, temperature, time, vacuum, spray drying or the like.

If the amount of hydroxyl group is less than 0.1 mmol/g, the reactive sites with the cocatalyst are reduced. If the amount of hydroxyl group is more than 10 mmol/g, it may be caused by moisture besides the hydroxyl groups present on the surface of support particles, which is not preferable.

The hybrid supported metallocene catalyst according to the present invention may be prepared by, for example, the steps of supporting a cocatalyst compound on a support; supporting the first metallocene compound represented by Chemical Formula 1 on the support; and supporting the second cocatalyst compound selected from the compounds represented by Chemical Formulae 3 to 5 on the support.

In the method of preparing the hybrid supported metallocene catalyst, the order of performing the step of supporting the first metallocene compound and the step of supporting the second metallocene compound may be changed as needed. In other words, after supporting the first metallocene compound on the support, the second metallocene compound may be additionally supported to prepare the hybrid supported metallocene catalyst. Alternatively, after supporting the second metallocene compound on the support, the first metallocene compound may be additionally supported to prepare the hybrid supported metallocene catalyst.

Upon preparation of the hybrid supported metallocene catalyst, hydrocarbon solvents such as pentane, hexane, heptane, etc., or aromatic solvents such as benzene, toluene, etc. may be used as a reaction solvent. Further, the metallocene compound and the cocatalyst compound may be used in the form of being supported on silica or alumina.

The hybrid supported metallocene catalyst according to the present invention may be used in the polymerization of olefin-based monomers as it is. Also, the hybrid supported metallocene catalyst according to the present invention may be prepared as a pre-polymerized catalyst by contacting the catalyst with an olefin-based monomer. For example, it may be prepared as a pre-polymerized catalyst by contacting the catalyst with an olefin-based monomer such as ethylene, propylene, 1-butene, 1-hexene, 1-octene or the like.

Meanwhile, the olefin-based polymer according to the present invention may be prepared by polymerizing olefin-based monomers in the presence of the above-described hybrid supported metallocene catalyst.

The olefin-based monomer may be ethylene, alpha-olefin, cyclic olefin, diene olefin or triene olefin having two or more double bonds. Specific examples of the olefin-based monomer include ethylene, propylene, 1-butene, 1-pentene, 4-methyl-1-pentene, 1-hexene, 1-heptene, 1-octene, 1-decene, 1-undecene, 1-dodecene, 1-tetradecene, 1-hexadecene, 1-eicosene, norbornene, norbornadiene, ethylidenenorbornene, phenylnorbornene, vinylnorbornene, dicyclopentadiene, 1,4-butadiene, 1,5-pentadiene, 1,6-hexadiene, styrene, alpha-methylstyrene, divinylbenzene, 3-chloromethylstyrene or the like, and it is also possible to copolymerize a mixture of two or more monomers thereof.

The olefin-based polymer is more preferably an ethylene/alpha-olefin copolymer, but is not limited thereto.

When the olefin-based polymer is the ethylene/alpha-olefin copolymer, the content of the comonomer alpha-olefin is not particularly limited, and may be appropriately selected according to use or purpose of the olefin-based polymer. More specifically, the content may be more than 0 mole % and 99 mole % or less.

The polymerization reaction may be carried out by homopolymerizing one type of olefin-based monomer or copolymerizing two types or more of monomers using a continuous slurry polymerization reactor, a loop slurry reactor, a gas phase reactor, or a solution reactor.

A polymerization temperature may be about 25° C. to about 500° C., preferably about 25° C. to about 200° C., and more preferably about 50° C. to about 150° C. Further, a polymerization pressure may be about 1 $Kgf/cm^2$ to about 100 $Kgf/cm^2$, preferably about 1 $Kgf/cm^2$ to about 50 $Kgf/cm^2$, and more preferably about 5 $Kgf/cm^2$ to about 30 $Kgf/cm^2$.

The hybrid supported metallocene catalyst may be injected after being dissolved or diluted in an aliphatic hydrocarbon solvent having 5 to 12 carbon atoms, for example, pentane, hexane, heptane, nonane, decane, and isomers thereof, an aromatic hydrocarbon solvent such as toluene and benzene, a chlorine-substituted hydrocarbon solvent such as dichloromethane and chlorobenzene, etc. The solvent used herein may be preferably treated with a trace amount of alkyl aluminum to remove catalytic poisons such as water, air, etc. The polymerization may be also performed by further using the cocatalyst.

An olefin-based copolymer having a bimodal or multimodal molecular weight distribution curve may be prepared by using the hybrid supported metallocene catalyst. When the hybrid supported metallocene catalyst is used, an olefin-based polymer having a relatively high molecular weight may be prepared by the first metallocene compound, and an olefin-based polymer having a relatively low molecular weight may be prepared by the second metallocene compound. In particular, when the hybrid supported metallocene catalyst includes one or more first metallocene compounds of Chemical Formula 1, one or more second metallocene compounds of Chemical Formula 2, and one or more second metallocene compounds of Chemical Formula 3, olefin-based polymers having a high molecular weight, a low molecular weight, and a medium molecular weight are produced, thereby preparing olefin-based polymers having a broad molecular weight distribution and also including LCB (Long Chain Branch) having side chain branches of 8 or more carbon atoms in the main chain. These olefin-based polymers have excellent processability as well as excellent physical properties.

Hereinafter, the preferred Examples are provided for better understanding. However, these Examples are for illustrative purposes only, and the invention is not intended to be limited by these Examples.

EXAMPLE

Preparation Example of First Metallocene Compound

Preparation Example 1

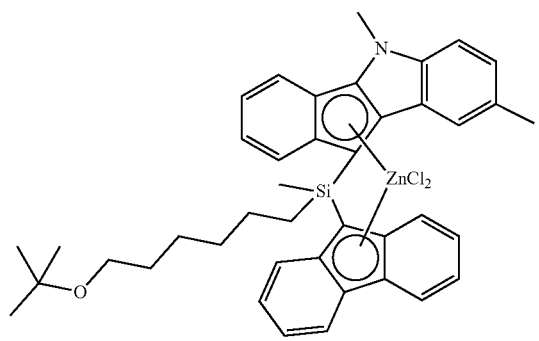

1-1 Preparation of Ligand Compound 2 g of fluorene was dissolved in 5 mL of MTBE and 100 mL of hexane, and 5.5 mL of 2.5 M n-BuLi hexane solution was added dropwise in a dry ice/acetone bath and stirred overnight at room temperature. 3.6 g of (6-(tert-butoxy)hexyl)dichloro(methyl)silane was dissolved in 50 mL of hexane, and fluorene-Li slurry was transferred under a dry ice/acetone bath for 30 minutes and stirred overnight at room temperature. At the same time, 5,8-dimethyl-5,10-dihydroindeno[1,2-b]indole (12 mmol, 2.8 g) was also dissolved in 60 mL of THF (60 mL), and 5.5 mL of 2.5M n-BuLi hexane solution was added dropwise in a dry ice/acetone bath and stirred overnight at room temperature. The reaction solution of fluorene and (6-(tert-butoxy)hexyl)dichloro(methyl)silane was subjected to NMR sampling to confirm the completion of reaction. Thereafter, the 5,8-dimethyl-5,10-dihydroindeno[1,2-b]indole-Li solution was transferred under a dry ice/acetone bath and stirred overnight at room temperature. After reaction, the reaction mixture was extracted with ether/water and the remaining moisture in the organic layer was removed with $MgSO_4$ to give a ligand compound (Mw 597.90, 12 mmol). It was confirmed by $^1$H-NMR that two isomers were produced.

$^1$H NMR (500 MHz, $d_6$-benzene): −0.30~−0.18 (3H, d), 0.40 (2H, m), 0.65~1.45 (8H, m), 1.12 (9H, d), 2.36~2.40 (3H, d), 3.17 (2H, m), 3.41~3.43 (3H, d), 4.17~4.21 (1H, d), 4.34~4.38 (1H, d), 6.90~7.80 (15H, m)

1-2 Preparation of Metallocene Compound 7.2 g (12 mmol) of the ligand compound synthesized in 1-1 was dissolved in 50 mL of diethylether, and 11.5 mL of 2.5 M n-BuLi hexane solution was added dropwise in a dry ice/acetone bath and stirred overnight at room temperature. The mixture was dried under vacuum to give a brown-colored sticky oil. This oil was dissolved in toluene to give a slurry. $ZrCl_4(THF)_2$ was prepared, and 50 mL of toluene was added thereto to prepare a slurry. 50 mL of the toluene slurry of $ZrCl_4(THF)_2$ was transferred in a dry ice/acetone bath. As the mixture was stirred overnight at room temperature, the color was changed to violet. The reaction solution was filtered to remove LiCl. The filtrate was dried under vacuum to remove toluene, hexane was added thereto, and the mixture was sonicated for 1 hour. The slurry was filtered to give 6 g (Mw 758.02, 7.92 mmol, Yield 66 mol %) of a metallocene compound having a dark violet color as a filtered solid. Two isomers were observed on $^1$H-NMR.

$^1$H NMR (500 MHz, $CDCl_3$): 1.19 (9H, d), 1.71 (3H, d), 1.50~1.70 (4H, m), 1.79 (2H, m), 1.98~2.19 (4H, m), 2.58 (3H, s), 3.38 (2H, m), 3.91 (3H, d), 6.66~7.88 (15H, m)

Preparation Example 2

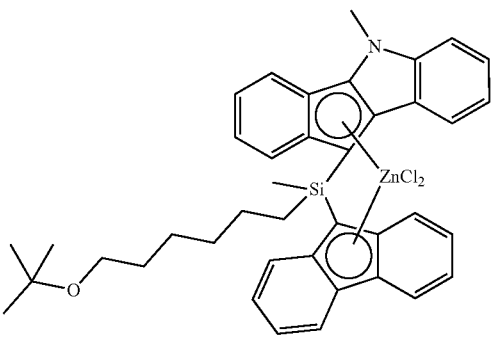

2-1 Preparation of Ligand Compound

To a 250 mL flask, introduced was 2.63 g (12 mmol) of 5-methyl-5,10-dihydroindeno[1,2-b]indole, which was then dissolved in 50 mL of THF. Then, 6 mL of 2.5 M n-BuLi hexane solution was added dropwise in a dry ice/acetone bath and stirred overnight at room temperature. In another 250 mL flask, 1.62 g (6 mmol) of (6-(tert-butoxy)hexyl)dichloro(methyl)silane was prepared by dissolving it in 100 mL of hexane, and then slowly added dropwise to a lithiated solution of 5-methyl-5,10-dihydroindeno[1,2-b]indole under a dry ice/acetone bath and stirred overnight at room temperature. After reaction, the mixture was extracted with ether/water. The organic layer was treated with $MgSO_4$ to remove the remaining moisture and then dried under vacuum to give 3.82 g (6 mmol) of a ligand compound, which was confirmed by $^1$H-NMR.

NMR (500 MHz, CDCl$_3$): −0.33 (3H, m), 0.86~1.53 (10H, m), 1.16 (9H, d), 3.18 (2H, m), 4.07 (3H, d), 4.12 (3H, d), 4.17 (1H, d), 4.25 (1H, d), 6.95~7.92 (16H, m) 2-2 Preparation of Metallocene Compound 3.82 g (6 mmol) of the ligand compound synthesized in 2-1 was dissolved in 100 mL of toluene and 5 mL of MTBE, and then 5.6 mL (14 mmol) of 2.5 M n-BuLi hexane solution was added dropwise in a dry ice/acetone bath and stirred overnight at room temperature. In another flask, 2.26 g (6 mmol) of ZrCl$_4$(THF)$_2$ was prepared as a slurry by adding toluene (100 mL). The toluene slurry of ZrCl$_4$(THF)$_2$ was transferred to the litiated ligand in a dry ice/acetone bath. The mixture was stirred overnight at room temperature, and the color was changed to violet. The reaction solution was filtered to remove LiCl. The filtrate thus obtained was dried under vacuum, hexane was added thereto, and the mixture was sonicated. The slurry was filtered to give 3.40 g (Yield 71.1 mole %) of a metallocene compound having a dark violet color as a filtered solid.

$^1$H NMR (500 MHz, CDCl$_3$): 1.74 (3H, d), 0.85-2.33 (10H, m), 1.29 (9H, d), 3.87 (3H, s), 3.92 (3H, s), 3.36 (2H, m), 6.48~8.10 (16H, m)

Preparation Example of Second Metallocene Compound

Preparation Example 3

Preparation of [tBu-O—(CH$_2$)$_6$—C$_5$H$_4$]$_2$ZrCl$_2$ t-Butyl-O—(CH$_2$)$_6$—Cl was prepared using 6-chlorohexanol according to a method described in the literature (Tetrahedron Lett. 2951 (1988)), and then reacted with NaCp to obtain t-Butyl-O—(CH$_2$)$_6$—C$_5$H$_5$ (Yield 60%, b.p. 80° C./0.1 mmHg).

Also, t-Butyl-O—(CH$_2$)$_6$—C$_5$H$_5$ was dissolved in THF at −78° C., normal butyllithium (n-BuLi) was slowly added thereto, and the mixture was warmed up to room temperature and then reacted for 8 hours. At a temperature of −78° C., the lithium salt solution thus prepared was slowly added to a suspension solution of ZrCl$_4$(THF)$_2$ (1.70 g, 4.50 mmol)/THF(30 ml), and the mixture was further reacted at room temperature for 6 hours.

All volatile substances were dried under vacuum, and a hexane solvent was added to the resulting oily liquid substance, and then filtered. The filtrate was dried under vacuum, and hexane was added to induce precipitation at a low temperature (−20° C.). The resulting precipitate was filtered at a low temperature to give a [tBu-O—(CH$_2$)$_6$—C$_5$H$_4$]$_2$ZrCl$_2$ compound (Yield 92%) as a white solid.

$^1$H NMR (300 MHz, CDCl$_3$): 6.28 (t, J=2.6 Hz, 2H), 6.19 (t, J=2.6 Hz, 2H), 3.31 (t, 6.6 Hz, 2H), 2.62 (t, J=8 Hz), 1.7-1.3 (m, 8H), 1.17 (s, 9H).
$^{13}$C NMR (CDCl$_3$): 135.09, 116.66, 112.28, 72.42, 61.52, 30.66, 30.61, 30.14, 29.18, 27.58, 26.00.

Preparation Example 4

Preparation of (tBu-O—(CH$_2$)$_6$)(CH$_3$)Si(C$_5$(CH$_2$)$_4$)(tBu-N)TiCl$_2$ 50 g of Mg(s) was introduced to a 10 L reactor at room temperature, and then 300 mL of THF was added thereto. 0.5 g of I$_2$ was added, and then the reactor was maintained at a temperature of 50° C. When the temperature of the reactor was stabilized, 250 g of 6-t-butoxyhexyl chloride was added to the reactor at a rate of 5 mL/min using a feeding pump. As 6-t-butoxyhexyl chloride was added, it was observed that the temperature of the reactor was elevated to about 4° C. to 5° C. The mixture was stirred for 12 hours while continuously adding 6-t-butoxyhexyl chloride. After reaction for 12 hours, a black reaction solution was produced. 2 mL of this black solution was taken, to which water was added to obtain an organic layer. The organic layer was confirmed to be 6-t-butoxyhexane through $^1$H-NMR. 6-t-butoxyhexane indicates that Grignard reaction occurred well. Consequently, 6-t-butoxyhexyl magnesium chloride was synthesized.

500 g of MeSiCl$_3$ and 1 L of THF were introduced to a reactor, and the temperature of the reactor was then cooled down to −20° C. 560 g of the above synthesized 6-t-butoxyhexyl magnesium chloride was added to the reactor at a rate of 5 mL/min using a feeding pump. After completion of the feeding of Grignard reagent, the mixture was stirred for 12 hours while slowly raising the temperature of the reactor up to room temperature. After reaction for 12 hours, it was confirmed that white MgCl$_2$ salt was produced. 4 L of hexane was added thereto and the salt was removed through a labdori to give a filtered solution. This filtered solution was added to the reactor, and hexane was then removed at 70° C. to give a light yellow-colored liquid. This liquid was confirmed to be a desired compound methyl(6-t-butoxyhexyl)dichlorosilane through $^1$H-NMR.

$^1$H-NMR (CDCl$_3$): 3.3 (t, 2H), 1.5 (m, 3H), 1.3 (m, 5H), 1.2 (s, 9H), 1.1 (m, 2H), 0.7 (s, 3H)

1.2 mol (150 g) of tetramethylcyclopentadiene and 2.4 L of THF were added to the reactor and the temperature of the reactor was then cooled down to −20° C. 480 mL of n-BuLi was added to the reactor at a rate of 5 ml/min using a feeding pump. After adding n-BuLi, the mixture was stirred for 12 hours while slowly raising the temperature of the reactor up to room temperature. After reaction for 12 hours, an equivalent of methyl(6-t-butoxyhexyl)dichlorosilane (326 g, 350 mL) was rapidly added to the reactor. The mixture was stirred for 12 hours while slowly raising the temperature of the reactor up to room temperature. Then, the temperature of the reactor was cooled to 0° C. again, and two equivalents of t-BuNH$_2$ were added. The mixture was stirred for 12 hours while slowly raising the temperature of the reactor up to room temperature. After reaction for 12 hours, THF was removed. 4 L of hexane was added and the salt was removed through a labdori to give a filtered solution. This filtered solution was added to the reactor again, and hexane was removed at 70° C. to give a yellow-colored solution. This yellow solution was confirmed to be a compound methyl(6-t-butoxyhexyl)(tetramethylCpH)t-butylaminosilane through $^1$H-NMR.

TiCl$_3$(THF)$_3$(10 mmol) was rapidly added to the dilithium salt of the ligand at −78° C., which was synthesized from n-BuLi and the ligand dimethyl(tetramethylCpH)t-Butylaminosilane in THF solution. While slowly warming the reaction solution from −78° C. to room temperature, it was stirred for 12 hours. After stirring for 12 hours, an equivalent of PbCl$_2$ (10 mmol) was added to the reaction solution at room temperature, and then stirred for 12 hours. After stirring for 12 hours, a blue-colored dark black solution was obtained. THF was removed from the reaction solution thus obtained, and then hexane was added. A product was filtered. Hexane was removed from the filtered solution, and then it was confirmed through $^1$H-NMR that (tBu-O—(CH$_2$)$_6$)

(CH$_3$)Si(C$_5$(CH$_3$)$_4$)(tBu-N)TiCl$_2$ was produced, which is desired ([methyl(6-t-buthoxyhexyl)silyl(η5-tetramethylCp)(t-Butylamido)]TiCl$_2$).

$^1$H-NMR (CDCl$_3$): 3.3 (s, 4H), 2.2 (s, 6H), 2.1 (s, 6H), 1.8~0.8 (m), 1.4 (s, 9H), 1.2 (s, 9H), 0.7 (s, 3H)

Preparation Example of Hybrid Supported Catalyst

Example 1

6.0 kg of a toluene solution was added to a 20 L-sus high pressure reactor, and the reactor temperature was maintained at 40° C. 1,000 g of silica (manufactured by Grace Davison, SYLOPOL 948) dehydrated at 600° C. under vacuum for 12 hours was injected to the reactor, and silica was sufficiently dispersed. Then, 80 of the metallocene compound of Preparation Example 3 was dissolved in toluene and injected to the reactor, followed by stirring at 40° C. for 2 hours. Then, stirring was stopped, and the solution was allowed to settle for 30 minutes, followed by decantation of the reaction solution.

2.5 kg of toluene was injected to a reactor, and 9.4 kg of 10 wt % methylaluminoxane (MAO)/toluene solution was injected thereto, followed by stirring at 40° C. and 200 rpm for 12 hours. After reaction, stirring was stopped, and the solution was allowed to settle for 30 minutes, followed by decantation of the reaction solution. 3.0 kg of toluene was injected, followed by stirring for 10 minutes. Then, stirring was stopped, and the solution was allowed to settle for 30 minutes, followed by decantation of the toluene solution.

3.0 kg of toluene was injected to a reactor, and 314 mL of 29.2 wt % of the metallocene compound of Preparation Example 4/toluene solution was injected thereto, followed by stirring at 40° C. and 200 rpm for 12 hours.

80 g of the metallocene compound of Preparation Example 1 and 1,000 ml of toluene were put in a flask to prepare a solution, followed by sonication for 30 minutes. The metallocene compound of Preparation Example 1/toluene solution thus prepared was injected to the reactor, followed by stirring at 40° C. and 200 rpm for 2 hours. The reactor temperature was decreased to room temperature, and then stirring was stopped, and the solution was allowed to settle for 30 minutes, followed by decantation of the reaction solution.

2.0 kg of toluene was injected to a reactor, followed by stirring for 10 minutes. Then, stirring was stopped, and the solution was allowed to settle for 30 minutes, followed by decantation of the toluene solution.

3.0 kg of hexane was injected to a reactor, and hexane slurry was transported to a filter dryer to filter the hexane solution. The solution was dried under reduced pressure at 40° C. for 4 hours to prepare 890 g of a SiO$_2$ hybrid supported catalyst.

Example 2

A supported catalyst was prepared in the same manner as in Example 1, except that 157 mL of the metallocene compound of Preparation Example 4/toluene solution was used and 40 g of the metallocene compound of Preparation Example 1 was injected in Example 1.

Example 3

6.0 kg of a toluene solution was added to a 20 L-sus high pressure reactor, and the reactor temperature was maintained at 40° C. 1,000 g of silica (manufactured by Grace Davison, SYLOPOL 948) dehydrated at 600° C. under vacuum for 12 hours was injected to the reactor, and silica was sufficiently dispersed. Then, 80 g of the metallocene compound of Preparation Example 3 was dissolved in toluene, and the solution was injected to the reactor, followed by stirring at 40° C. for 2 hours. Then, stirring was stopped, and the solution was allowed to settle for 30 minutes, followed by decantation of the reaction solution.

2.5 kg of toluene was injected to a reactor, and 9.4 kg of 10 wt % methylaluminoxane (MAO)/toluene solution was injected thereto, followed by stirring at 40° C. and 200 rpm for 12 hours. After reaction, stirring was stopped, and the solution was allowed to settle for 30 minutes, followed by decantation of the reaction solution. 3.0 kg of toluene was injected, followed by stirring for 10 minutes. Then, stirring was stopped, and the solution was allowed to settle for 30 minutes, followed by decantation of the toluene solution.

80 g of the metallocene compound of Preparation Example 1 and 1,000 ml of toluene were put in a flask to prepare a solution, followed by sonication for 30 minutes. The metallocene compound of Preparation Example 1/toluene solution thus prepared was injected to the reactor, followed by stirring at 40° C. and 200 rpm for 2 hours. The reactor temperature was decreased to room temperature, and then stirring was stopped, and the solution was allowed to settle for 30 minutes, followed by decantation of the reaction solution.

2.0 kg of toluene was injected to a reactor, followed by stirring for 10 minutes. Then, stirring was stopped, and the solution was allowed to settle for 30 minutes, followed by decantation of the toluene solution.

3.0 kg of hexane was injected to a reactor, and hexane slurry was transported to a filter dryer to filter the hexane solution. The solution was dried under reduced pressure at 40° C. for 4 hours to prepare 890 g of a SiO$_2$ hybrid supported catalyst.

Comparative Example 1

5.0 kg of a toluene solution was added to a 20 L-sus high pressure reactor, and the reactor temperature was maintained at 40° C. 1,000 g of silica (manufactured by Grace Davison, SYLOPOL 948) dehydrated at 600° C. under vacuum for 12 hours was injected to the reactor, and silica was sufficiently dispersed. Then, 80 of the metallocene compound of Preparation Example 3 was dissolved in toluene and injected to the reactor, followed by stirring at 40° C. for 2 hours. Then, stirring was stopped, and the solution was allowed to settle for 30 minutes, followed by decantation of the reaction solution.

2.5 kg of toluene was injected to a reactor, and 9.4 kg of 10 wt % methylaluminoxane (MAO)/toluene solution was injected thereto, followed by stirring at 40° C. and 200 rpm for 12 hours. After reaction, stirring was stopped, and the solution was allowed to settle for 30 minutes, followed by decantation of the reaction solution. 3.0 kg of toluene was injected, followed by stirring for 10 minutes. Then, stirring was stopped, and the solution was allowed to settle for 30 minutes, followed by decantation of the toluene solution.

3.0 kg of toluene was injected to a reactor, and 236 mL of 29.2 wt % metallocene compound of Preparation Example 4/toluene solution was injected to the reactor. The metallocene compound of Preparation Example 4/toluene solution thus prepared was injected to the reactor, followed by stirring at 40° C. and 200 rpm for 2 hours. After reaction, the reactor temperature was decreased to room temperature and stirring was stopped, and the solution was allowed to settle for 30 minutes, followed by decantation of the reaction solution.

2.0 kg of toluene was injected to a reactor, followed by stirring for 10 minutes. Then, stirring was stopped, and the solution was allowed to settle for 30 minutes, followed by decantation of the toluene solution.

3.0 kg of hexane was injected to a reactor, and hexane slurry was transported to a filter dryer to filter the hexane solution. The solution was dried under reduced pressure at 40° C. for 4 hours to prepare 910 g of a $SiO_2$ hybrid supported catalyst.

Experimental Example

Copolymerization of Ethylene-1-hexene

Each of the hybrid supported metallocene catalysts prepared in Examples 1 to 3 and Comparative Example 1 was injected to an isobutene slurry loop process continuous reactor (reactor volume: 140 L, reaction flow rate: 7 m/s) to prepare an olefin polymer. As a comonomer, 1-hexane was used, and a reactor pressure was maintained at 40 bar and a polymerization temperature was maintained at 90° C.

Polymerization conditions using the respective hybrid supported metallocene catalysts of Examples 1 to 3 and Comparative Example 1 are summarized in the following Table 1.

TABLE 1

| Catalyst used | Example 1 | Example 2 | Example 3 | Comparative Example 1 |
|---|---|---|---|---|
| Ethylene supply (kg/hr) | 33.0 | 33.0 | 30.0 | 29.7 |
| 1-Hexene input (wt %) | 2.9 | 2.5 | 2.7 | 2.1 |
| Hydrogen input (ppm) | 177 | 110 | 92 | 53 |
| Catalyst activity (kg PE/kg cat./hr) | 3.9 | 3.7 | 4.2 | 3.9 |

Evaluation of Physical Properties of Polymer

1) Density: ASTM 1505

2) Melt index (MFR, 2.16 kg/21.6 kg): measurement temperature of 190° C., ASTM 1238

3) MFRR ($MFR_{21.6}/MFR_{2.16}$): a ratio obtained by dividing $MFR_{21.6}$ melt index (MI, load of 21.6 kg) by $MFR_{2.16}$ (MI, load of 2.16 kg).

4) Molecular weight, Molecular weight distribution: after pretreatment by dissolving polymers in 0.0125% BHT-containing 1, 2, 4-trichlorobenzene at 160° C. for 10 hours using PL-SP260, a number average molecular weight and a weight average molecular weight were measured using PL-GPC220 at a measurement temperature of 160° C. A molecular weight distribution was expressed as a ratio of the weight average molecular weight and the number average molecular weight.

5) Slope of complex viscosity ($\eta^*$[Pa·s]) versus frequency ($\omega$[rad/s]) curve: by fitting a log scale curve of $\eta^*$[Pa·s] vs. $\omega$[rad/s] to power law ($C_1 x^{c_2}$), the value of $C_2$ was expressed as a slope of a complex viscosity versus frequency curve.

6) CI Index: when a molecular weight distribution curve was obtained by plotting a log value (log M) of a molecular weight (M) on the x-axis, and a molecular weight distribution (dwt/dlog M) with respect to the log value on the y-axis, SCB (Short Chain Branch) content (content of branches having 2 to 7 carbon atoms per 1,000 carbons, unit: branch/1,000 C) at the left and right borders of centered 60% area excluding 20% of the left and right ends in the total area was measured to calculate CI index based on the following Equation 1.

In this regard, the SCB content at high molecular weight side and the SCB content at low molecular weight side mean SCB content values at the left and right borders of centered 60% area, respectively. A sample was pretreated by dissolving it in 0.0125% BHT-containing 1, 2, 4-trichlorobenzene at 160° C. for 10 hours using PL-SP260, and then measurement was performed using a Perkin Elmer Spectrum 100 FT-IR connected with high temperature GPC (PL-GPC220) at 160° C.

CI Index=SCB content at high molecular weight side−SCB content at low molecular weight side/ SCB content at low molecular weight side　　[Equation 1]

TABLE 2

|  | Example 1 | Example 2 | Example 3 | Comparative Example 1 |
|---|---|---|---|---|
| Density (g/cm³) | 0.941 | 0.941 | 0.941 | 0.941 |
| $MFR_{2.16}$ | 0.41 | 0.55 | 0.42 | 0.63 |
| $MFR_{21.6}$ | 49.4 | 50.1 | 58.3 | 20.7 |
| MFRR | 120 | 91 | 138 | 33 |
| Number average molecular weight | 14,169 | 17,954 | 12,296 | 30,905 |
| Weight average molecular weight | 128,244 | 111,175 | 157,391 | 128,782 |
| Molecular weight distribution | 9.05 | 6.19 | 12.8 | 4.17 |
| Slope of complex viscosity versus frequency curve | −0.4909 | −0.4577 | −0.4707 | −0.3284 |
| CI Index | 1.054 | 1.1516 | 1.189 | 0.917 |

As shown in Table 2, it was confirmed that the olefin-based copolymers of Examples 1 to 3 which were prepared by using the hybrid supported metallocene catalyst have a high molecular weight, a low molecular weight, and a medium molecular weight, and thus exhibit a broad molecular weight distribution and a high melt flow rate ratio ($MFR_{21.6}/MFR_{2.16}$), thereby showing high flowability and excellent processability.

It was also confirmed that the olefin-based copolymers of Examples 1 to 3 include LCB (Long Chain Branch), as shown in a van Gurp-Palmen plot of FIG. 2, and olefin-based polymers having these characteristics exhibit excellent swell, bubble stability, melt fracture, sagging time, etc., thereby being applied to various fields according to the intended use.

What is claimed is:

1. An olefin-based polymer,
    wherein the olefin-based polymer is a copolymer of ethylene and an alpha-olefin-based comonomer, and wherein the olefin-based polymer has:
    a molecular weight distribution (Mw/Mn) of 5 to 30;
    a weight average molecular weight of from 100,000 to 160,000 g/mol;
    a melt flow rate ratio ($MFR_{21.6}/MFR_{2.16}$) of 35 to 200, which is measured at 190° C. in accordance with ASTM1238;
    a slope of −0.8 to −0.2 in a curve of complex viscosity ($\eta^*[Pa \cdot s]$) versus frequency ($\omega[rad/s]$); and
    a CI (Co-monomer Incorporation) Index of 0.5 to 5, the CI index represented by the following Equation 1:

CI Index=SCB content at high molecular weight side−SCB content at low molecular weight side/ SCB content at low molecular weight side  [Equation 1]

wherein the SCB (Short Chain Branch) content means a content (unit: branch/1,000 C) of side chain branches of 2 to 7 carbon atoms per 1,000 carbons, and
    the SCB content at low molecular weight side and the SCB content at high molecular weight side mean SCB contents at the left border (SCB content at low molecular weight side) and the right border (SCB content at high molecular weight side) of centered 60% area excluding 20% of the left and right ends in the total area of a molecular weight distribution curve which is obtained by plotting a log value (log M) of a molecular weight (M) of the olefin-based polymer on the x-axis, and a molecular weight distribution (dwt/dlog M) with respect to the log value on the y-axis.

2. The olefin-based polymer of claim 1, wherein its density is 0.930 to 0.950 g/cm$^3$.

3. The olefin-based polymer of claim 1, wherein the olefin-based polymer has LCB (Long Chain Branch).

4. The olefin-based polymer of claim 1, wherein the olefin-based polymer is prepared by polymerizing ethylene and the alpha-olefin-based comonomer in the presence of a hybrid supported metallocene catalyst comprising one or more first metallocene compounds represented by the following Chemical Formula 1; one or more second metallocene compounds selected from compounds represented by the following Chemical Formulae 3 to 5; a cocatalyst compound; and a support:

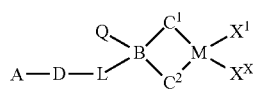

[Chemical Formula 1]

wherein A is hydrogen, halogen, a C1 to C20 alkyl group, a C2 to C20 alkenyl group, a C6 to C20 aryl group, a C7 to C20 alkylaryl group, a C7 to C20 arylalkyl group, a C1 to C20 alkoxy group, a C2 to C20 alkoxyalkyl group, a C3 to C20 heterocycloalkyl group, or a C5 to C20 heteroaryl group;

D is —O—, —S—, —N(R)— or —Si(R)(R')—, wherein R and R' are the same as or different from each other, and each independently hydrogen, halogen, a C1 to C20 alkyl group, a C2 to C20 alkenyl group, or a C6 to C20 aryl group;

L is a linear or branched C1 to C10 alkylene group;

B is carbon, silicon, or germanium;

Q is hydrogen, halogen, a C1 to C20 alkyl group, a C2 to C20 alkenyl group, a C6 to C20 aryl group, a C7 to C20 alkylaryl group, or a C7 to C20 arylalkyl group;

M is a Group 4 transition metal;

$X^1$ and $X^2$ are the same as or different from each other, and each independently halogen, a C1 to C20 alkyl group, a C2 to C20 alkenyl group, a C6 to C20 aryl group, a nitro group, an amido group, a C1 to C20 alkylsilyl group, a C1 to C20 alkoxy group, or a C1 to C20 sulfonate group;

$C^1$ and $C^2$ are the same as or different from each other, and each independently represented by one of the following Chemical Formula 2a, the following Chemical Formula 2b, or the following Chemical Formula 2c, excluding that both $C^1$ and $C^2$ are Chemical Formula 2c;

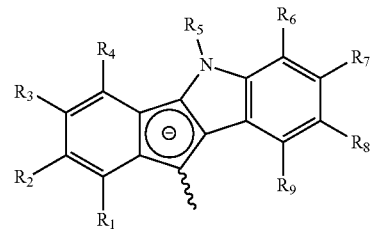

[Chemical Formula 2a]

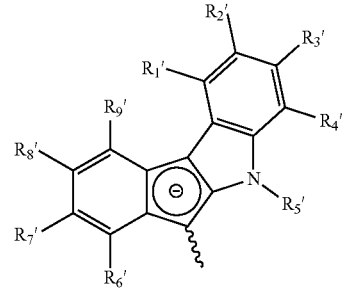

[Chemical Formula 2b]

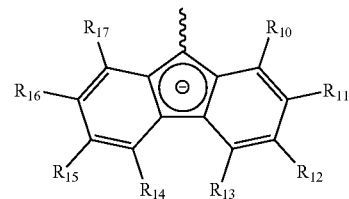

[Chemical Formula 2c]

wherein $R_1$ to $R_{17}$ and $R_1'$ to $R_9'$ are the same as or different from each other, and each independently hydrogen, halogen, a C1 to C20 alkyl group, a C2 to C20 alkenyl group, a C1 to C20 alkylsilyl group, a C1 to C20 silylalkyl group, a C1 to C20 alkoxysilyl group, a C1 to C20 alkoxy group, a C6 to C20 aryl group, a C7 to C20 alkylaryl group, or a C7 to C20 arylalkyl group, and two or more adjacent groups of $R_{10}$ to $R_{17}$ are connected to each other to form substituted or unsubstituted aliphatic rings or aromatic rings;

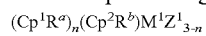  [Chemical Formula 3]

wherein $M^1$ is a Group 4 transition metal;

$Cp^1$ and $Cp^2$ are the same as or different from each other, and each independently any one selected from the group consisting of cyclopentadienyl, indenyl, 4,5,6,7-tetrahydro-1-indenyl, and fluorenyl radicals, each of which may be substituted with a hydrocarbon having 1 to 20 carbon atoms;

$R^a$ and $R^b$ are the same as or different from each other, and each independently hydrogen, C1 to C20 alkyl, C1 to C10 alkoxy, C2 to C20 alkoxyalkyl, C6 to C20 aryl, C6 to C10 aryloxy, C2 to C20 alkenyl, C7 to C40 alkylaryl, C7 to C40 arylalkyl, C8 to C40 arylalkenyl, or C2 to C10 alkynyl;

$Z^1$ is a halogen atom, C1 to C20 alkyl, C2 to C10 alkenyl, C7 to C40 alkylaryl, C7 to C40 arylalkyl, C6 to C20 aryl, substituted or unsubstituted C1 to C20 alkylidene, substituted or unsubstituted amino group, C2 to C20 alkylalkoxy, or C7 to C40 arylalkoxy;

n is 1 or 0;

$(Cp^3R^c)_mB^1(Cp^4R^d)M^2Z^2_{3-m}$     [Chemical Formula 4]

wherein $M^2$ is a Group 4 transition metal;

$Cp^3$ and $Cp^4$ are the same as or different from each other, and each independently any one selected from the group consisting of cyclopentadienyl, indenyl, 4,5,6,7-tetrahydro-1-indenyl, and fluorenyl radicals, each of which may be substituted with a hydrocarbon having 1 to 20 carbon atoms;

$R^c$ and $R^d$ are the same as or different from each other, and each independently hydrogen, C1 to C20 alkyl, C1 to C10 alkoxy, C2 to C20 alkoxyalkyl, C6 to C20 aryl, C6 to C10 aryloxy, C2 to C20 alkenyl, C7 to C40 alkylaryl, C7 to C40 arylalkyl, C8 to C40 arylalkenyl, or C2 to C10 alkynyl;

$Z^2$ is a halogen atom, C1 to C20 alkyl, C2 to C10 alkenyl, C7 to C40 alkylaryl, C7 to C40 arylalkyl, C6 to C20 aryl, substituted or unsubstituted C1 to C20 alkylidene, a substituted or unsubstituted amino group, C2 to C20 alkylalkoxy, or C7 to C40 arylalkoxy;

$B^1$ is one or more of radicals containing a carbon, germanium, silicon, phosphorous, or nitrogen atom, which crosslink $Cp^3R^c$ ring to $Cp^4R^d$ ring or crosslink one $Cp^4R^d$ ring to $M^2$, or a combination thereof, and m is 1 or 0;

$(Cp^5R^e)B^2(J)M^3Z^3_2$     [Chemical Formula 5]

wherein $M^3$ is a Group 4 transition metal;

$Cp^5$ is any one selected from the group consisting of cyclopentadienyl, indenyl, 4,5,6,7-tetrahydro-1-indenyl and fluorenyl radicals, each of which may be substituted with a hydrocarbon having 1 to 20 carbon atoms;

$R^e$ is hydrogen, C1 to C20 alkyl, C1 to C10 alkoxy, C2 to C20 alkoxyalkyl, C6 to C20 aryl, C6 to C10 aryloxy, C2 to C20 alkenyl, C7 to C40 alkylaryl, C7 to C40 arylalkyl, C8 to C40 arylalkenyl, or C2 to C10 alkynyl;

$Z^3$ is a halogen atom, C1 to C20 alkyl, C2 to C10 alkenyl, C7 to C40 alkylaryl, C7 to C40 arylalkyl, C6 to C20 aryl, substituted or unsubstituted C1 to C20 alkylidene, a substituted or unsubstituted amino group, C2 to C20 alkylalkoxy, or C7 to C40 arylalkoxy;

$B^2$ is one or more of radicals containing a carbon, germanium, silicon, phosphorous or nitrogen atom, which crosslink $Cp^5R^e$ ring to J, or a combination thereof; and J is any one selected from the group consisting of $NR^f$, O, $PR^f$ and S, wherein $R^f$ is C1 to C20 alkyl, aryl, substituted alkyl, or substituted aryl.

5. The olefin-based polymer of claim 4, wherein $R^1$ to $R_{17}$ and $R_1'$ to $R_9'$ of Chemical Formulae 2a, 2b and 2c are each independently hydrogen, a methyl group, an ethyl group, a propyl group, an isopropyl group, an n-butyl group, a tert-butyl group, a pentyl group, a hexyl group, a heptyl group, an octyl group, a phenyl group, a halogen group, a trimethylsilyl group, a triethylsilyl group, a tripropylsilyl group, a tributylsilyl group, a triisopropylsilyl group, a trimethylsilylmethyl group, a methoxy group, or an ethoxy group.

6. The olefin-based polymer of claim 4, wherein L in Chemical Formula 1 is a linear or branched C4 to C8 alkylene group.

7. The olefin-based polymer of claim 4, wherein A in Chemical Formula 1 is hydrogen, a methyl group, an ethyl group, a propyl group, an isopropyl group, an n-butyl group, a tert-butyl group, a methoxymethyl group, a tert-butoxymethyl group, a 1-ethoxyethyl group, a 1-methyl-1-methoxyethyl group, a tetrahydropyranyl group, or a tetrahydrofuranyl group.

8. The olefin-based polymer of claim 4, wherein the first metallocene compound represented by Chemical Formula 1 is any one of the following structural formulae:

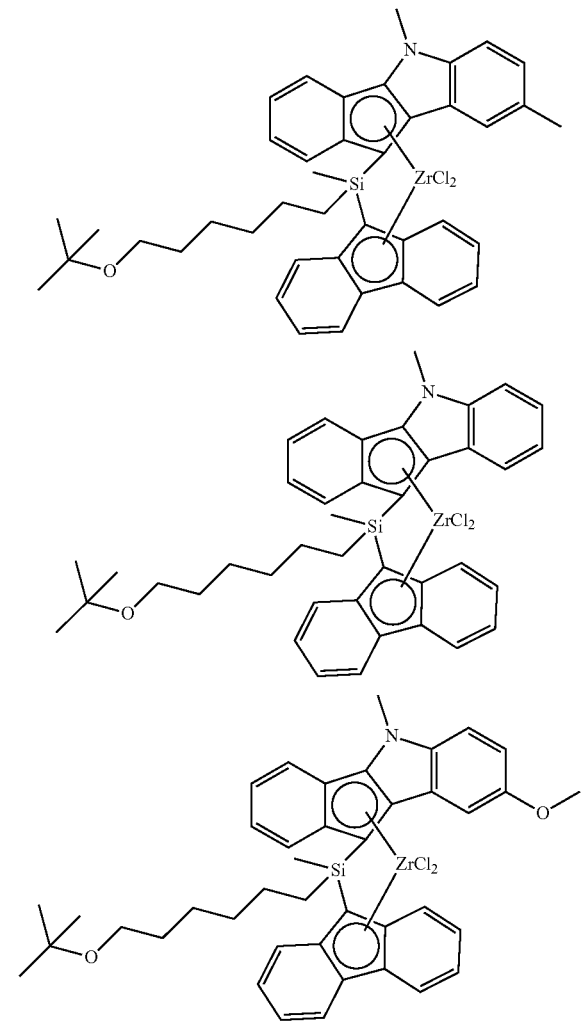

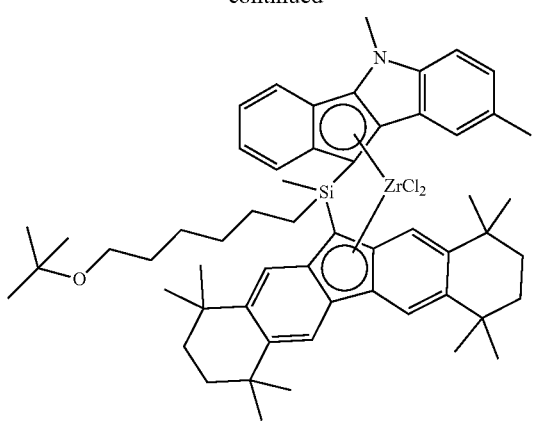
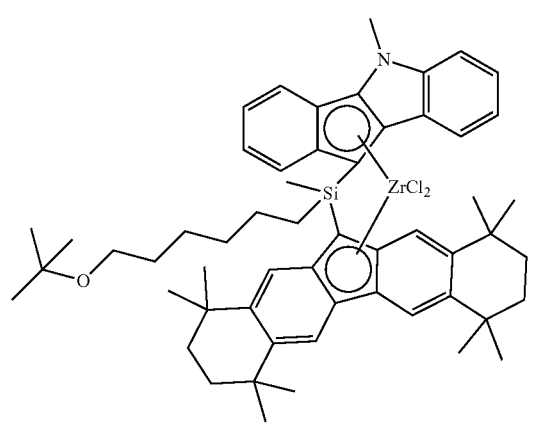
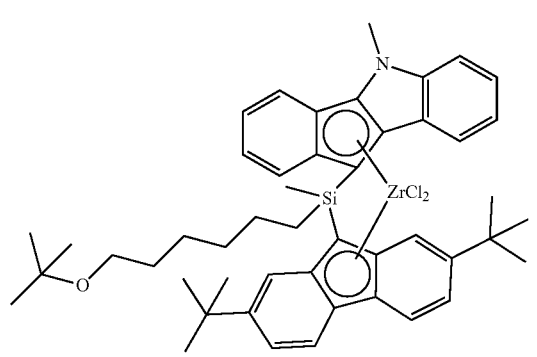
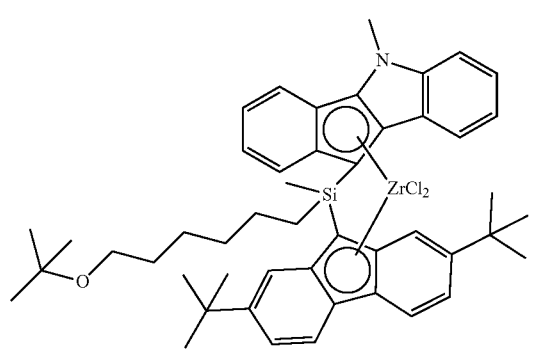
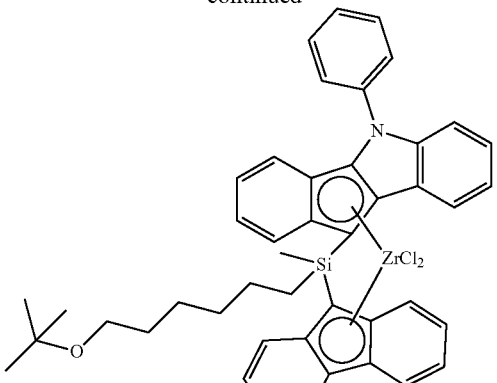
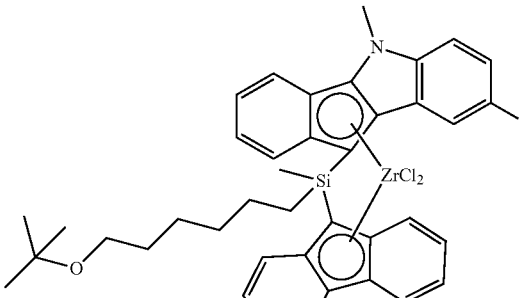
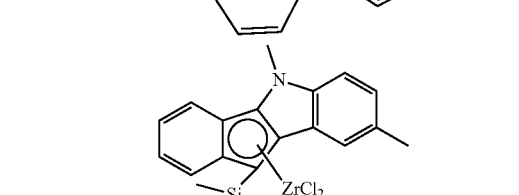
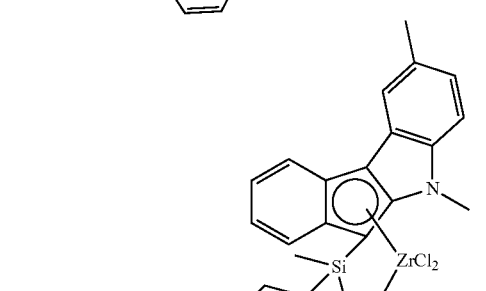
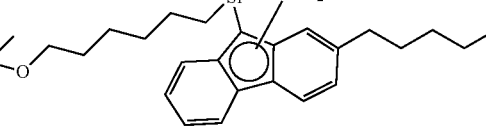

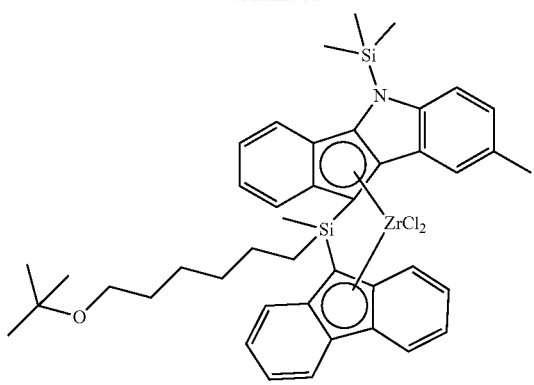
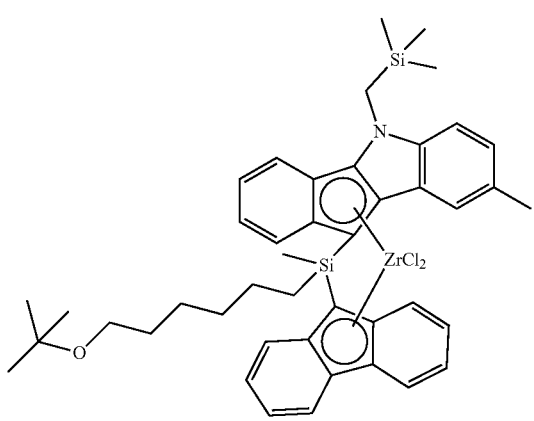
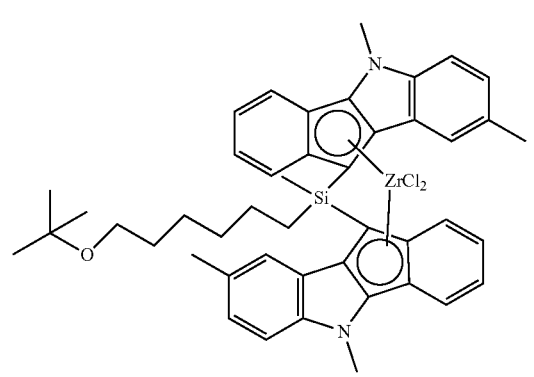
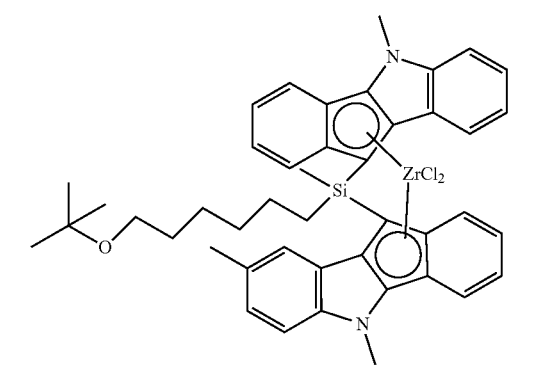
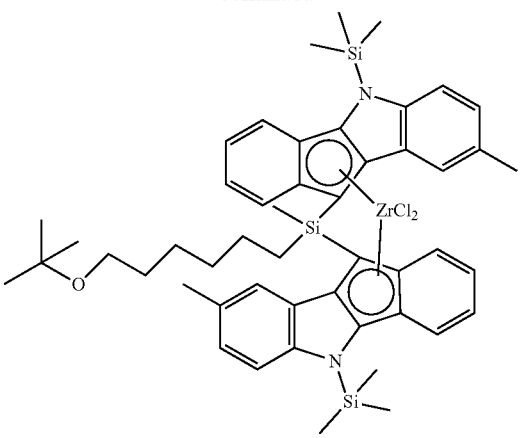
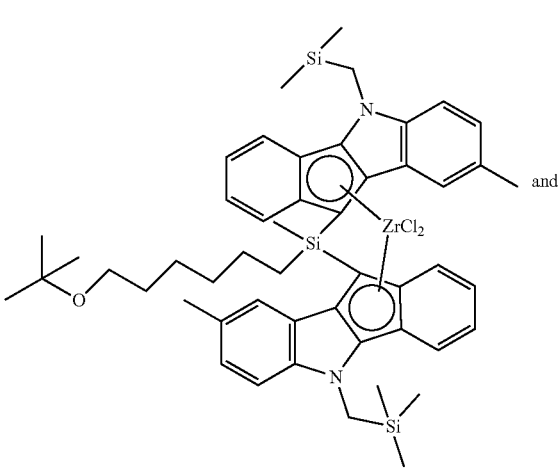
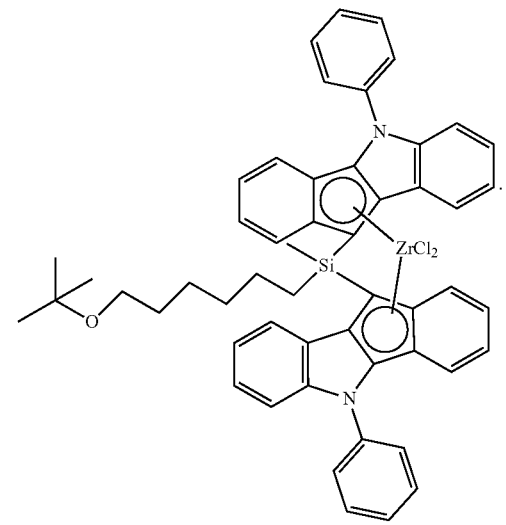
9. The olefin-based polymer of claim 4, wherein the second metallocene compound represented by Chemical Formula 3 is any one of the following structural formulae:

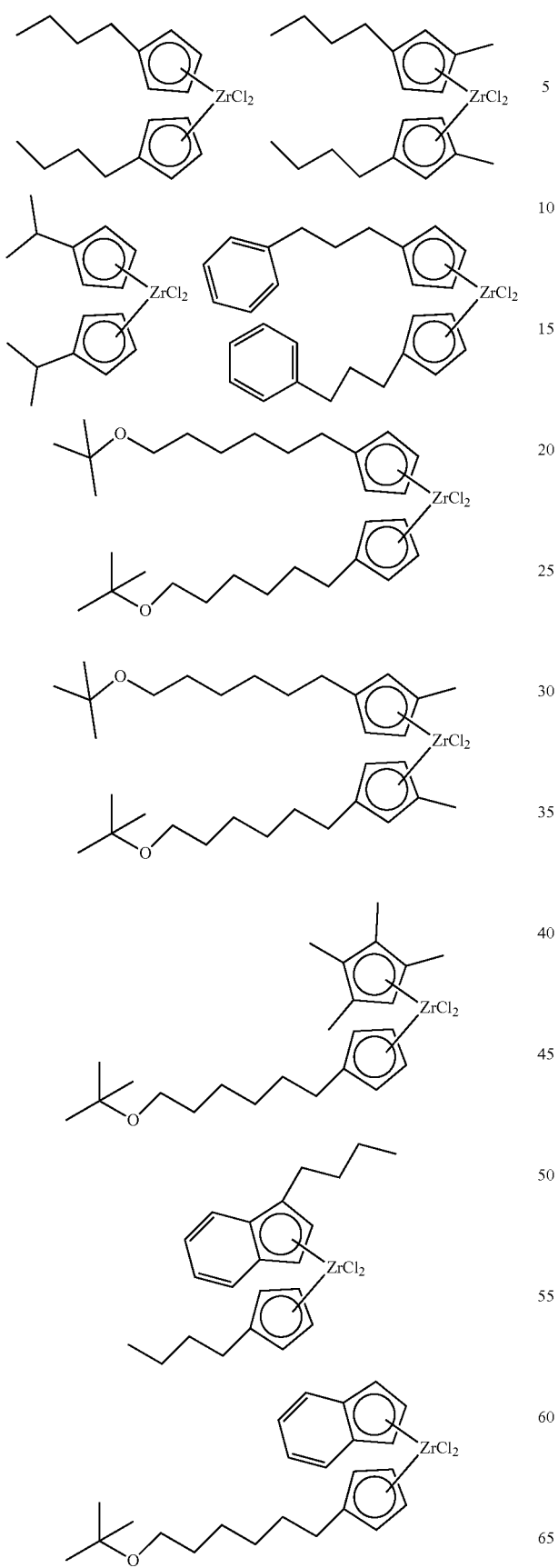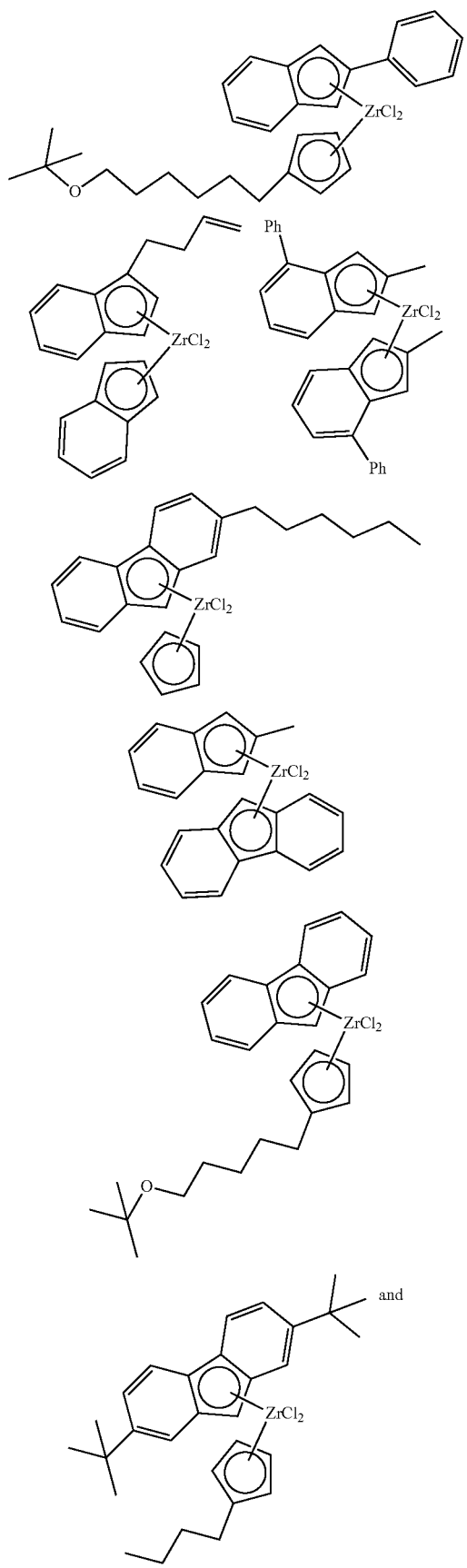

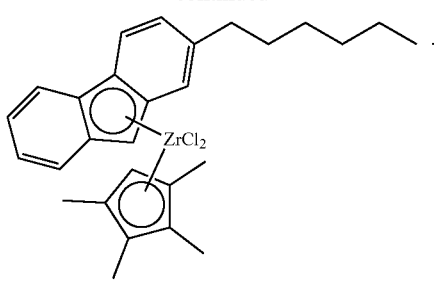
10. The olefin-based polymer of claim 4, wherein the second metallocene compound represented by Chemical Formula 4 is any one of the following structural formulae:
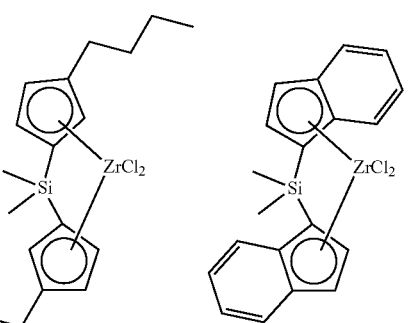
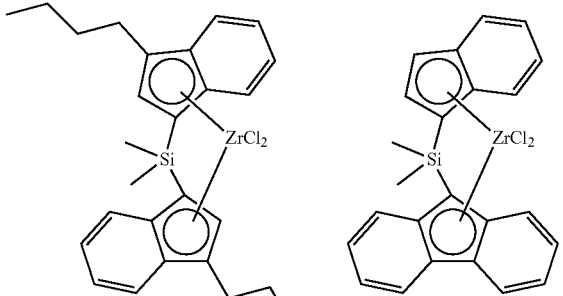
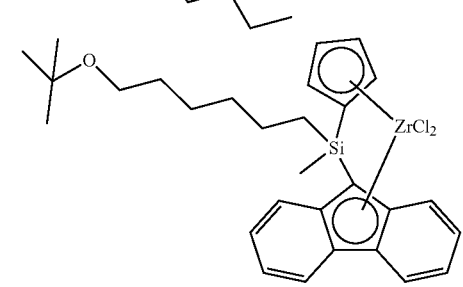
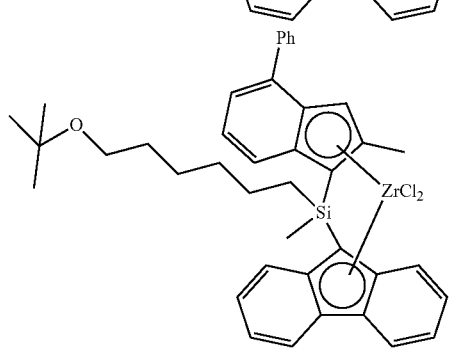
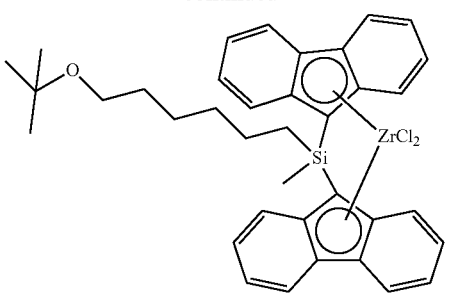
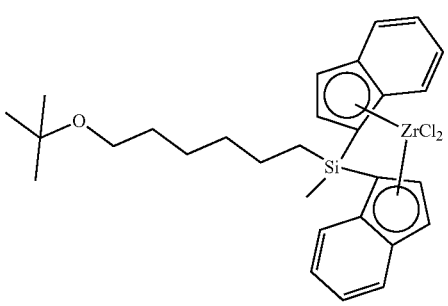
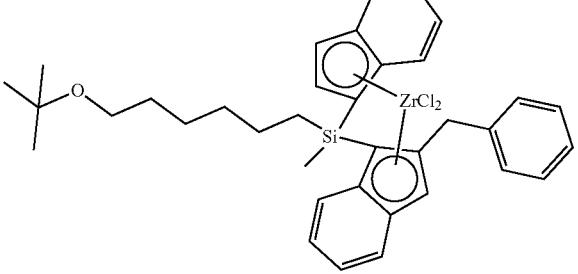
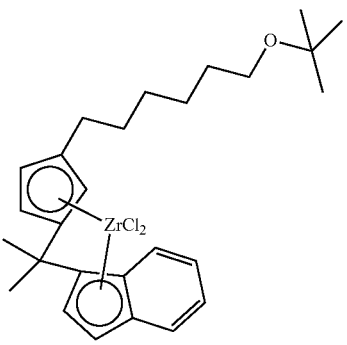

-continued
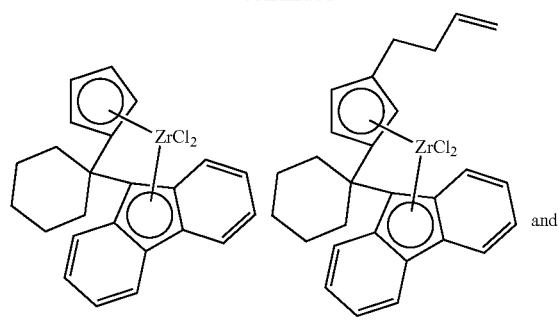
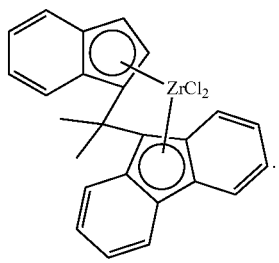
11. The olefin-based polymer of claim 4, wherein the second metallocene compound represented by Chemical Formula 5 is any one of the following structural formulae:
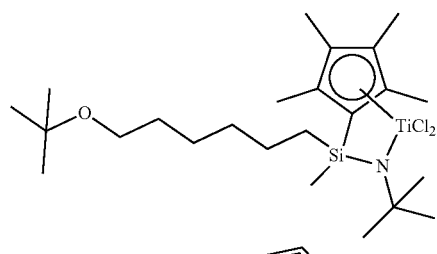
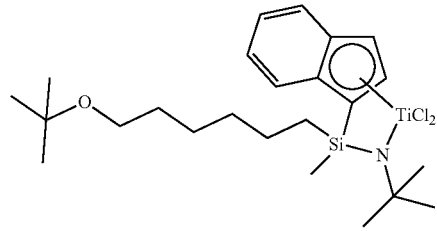
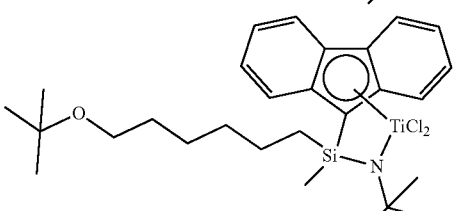
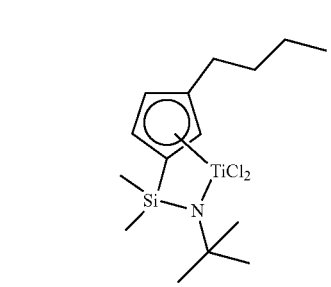
-continued
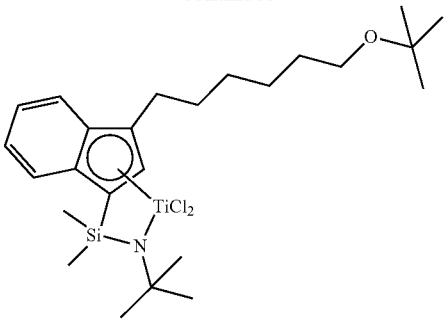
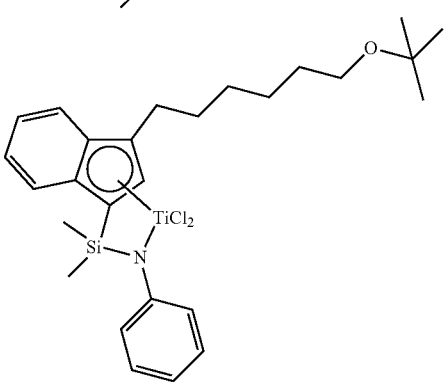
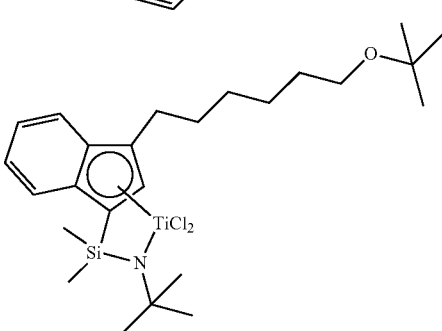
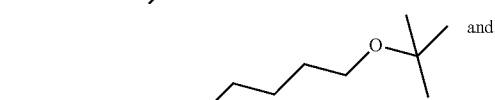
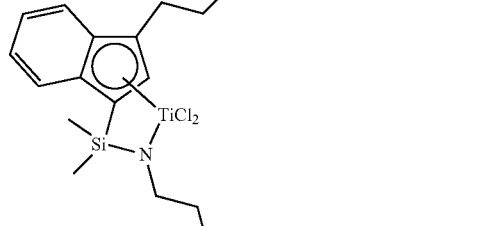
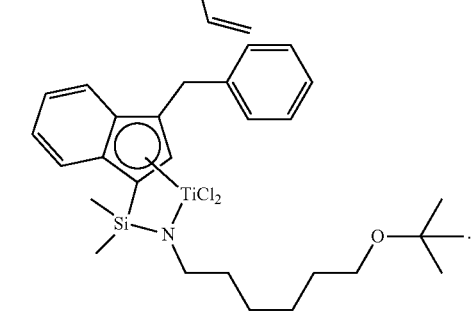
12. The olefin-based polymer of claim 4, wherein the cocatalyst compound comprises one or more selected from the group consisting of a first cocatalyst of the following Chemical Formula 6 and a second cocatalyst of the following Chemical Formula 7:

$$—[Al(R_{18})—O—]_k—$$ [Chemical Formula 6]

wherein $R_{18}$ is each independently halogen, or a halogen-substituted or unsubstituted hydrocarbyl group having 1 to 20 carbon atoms, and k is an integer of 2 or more, $$T^+[BG_4]^-$$ [Chemical Formula 7]

wherein $T^+$ is a monovalent polyatomic ion, B is boron in an oxidation state of +3, and G is each independently selected from the group consisting of a hydride group, a dialkylamido group, a halide group, an alkoxide group, an aryloxide group, a hydrocarbyl group, a halocarbyl group and a halo-substituted hydrocarbyl group, wherein G has 20 or less carbon atoms, provided that G is a halide group at one or less position.

13. The olefin-based polymer of claim 4, wherein a weight ratio of the transition metals of the first metallocene compound and the second metallocene compound to the support is 1:10 to 1:1,000.

14. The olefin-based polymer of claim 4, wherein a weight ratio of the cocatalyst compound to the support is 1:1 to 1:100.

* * * * *